United States Patent
Wei et al.

(10) Patent No.: US 12,184,432 B2
(45) Date of Patent: Dec. 31, 2024

(54) METHOD AND APPARATUS FOR MULTI-PDSCH RECEPTION AND HARQ FEEDBACK TRANSMISSION CONTROL

(71) Applicant: SHARP KABUSHIKI KAISHA, Sakai (JP)

(72) Inventors: Chia-Hung Wei, Taipei (TW); Heng-Li Chin, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 407 days.

(21) Appl. No.: 17/598,445

(22) PCT Filed: Mar. 26, 2020

(86) PCT No.: PCT/CN2020/081488
§ 371 (c)(1),
(2) Date: Sep. 27, 2021

(87) PCT Pub. No.: WO2020/192741
PCT Pub. Date: Oct. 1, 2020

(65) Prior Publication Data
US 2022/0190969 A1   Jun. 16, 2022

Related U.S. Application Data

(60) Provisional application No. 62/842,182, filed on May 2, 2019, provisional application No. 62/825,329, filed on Mar. 28, 2019.

(51) Int. Cl.
*H04L 1/1867* (2023.01)
(52) U.S. Cl.
CPC .................. *H04L 1/1887* (2013.01)
(58) Field of Classification Search
CPC ........... H04L 1/1887; H04L 1/1854; H04L 1/1864; H04L 5/0055; H04L 5/0094; H04L 1/1822; H04W 72/23
See application file for complete search history.

(56) References Cited

U.S. PATENT DOCUMENTS

2013/0188619 A1\* 7/2013 Dinan .............. H04W 56/0005
                                                                  370/336
2015/0358924 A1   12/2015 Papasakellariou
(Continued)

FOREIGN PATENT DOCUMENTS

| CN | 109478978 A   | 3/2019 |
|----|---------------|--------|
| EP | 3297367 A1    | 3/2018 |
| WO | 2018/128474 A1| 7/2018 |

OTHER PUBLICATIONS

3GPP TS 38.214, "3rd Generation Partnership Project; Technical Specification Group Radio Access Network; NR; Physical layer procedures for data (Release 15)", V15.10.0 (Jun. 2020).
(Continued)

*Primary Examiner* — Edan Orgad
*Assistant Examiner* — Malick A Sohrab
(74) *Attorney, Agent, or Firm* — ScienBiziP, P.C.

(57) ABSTRACT

A method performed by a User Equipment (UE) is provided. The method includes receiving a first Downlink (DL) assignment on a first Physical Downlink Control Channel (PDCCH), where the first DL assignment may determine a first time location of a first time slot including a first resource for transmitting first Hybrid Automatic Repeat reQuest (HARQ)-Acknowledgement (ACK) feedback. The method further includes performing a first DL process in response to receiving the first DL assignment, receiving a second DL assignment on a second PDCCH in a time interval between an end of the first PDCCH and a beginning of the first resource, and interrupting the first DL process in response to receiving the second DL assignment, where the first DL process includes at least one operation for the UE to generate the first HARQ-ACK feedback.

8 Claims, 10 Drawing Sheets

(56) References Cited

U.S. PATENT DOCUMENTS

| | | | |
|---|---|---|---|
| 2018/0019843 A1 | 1/2018 | Papasakellariou | |
| 2020/0053748 A1* | 2/2020 | Hosseini | H04W 72/569 |
| 2020/0053765 A1* | 2/2020 | Chien | H04L 1/1861 |
| 2021/0315005 A1* | 10/2021 | Choe | H04W 74/04 |
| 2022/0217760 A1* | 7/2022 | Iyer | H04L 5/0053 |

OTHER PUBLICATIONS

3GPP TS 38.321, "3rd Generation Partnership Project; Technical Specification Group Radio Access Network; NR; Medium Access Control (MAC) protocol specification (Release 15)", V15.9.0 (Jul. 2020).

CHTTL, "Discussion on Multi-TRP transmission", R1-1813278, 3GPP TSG RAN WG1 Meeting #95, Spokane, USA, Nov. 12-16, 2018, Nov. 2, 2018.

* cited by examiner

METHOD AND APPARATUS FOR MULTI-PDSCH RECEPTION AND HARQ FEEDBACK TRANSMISSION CONTROL

CROSS-REFERENCE TO RELATED APPLICATION(S)

The present application is the National Stage of International Patent Application Serial No. PCT/CN2020/081488, filed on Mar. 26, 2020, entitled "Method and Apparatus with Multi-PDSCH Reception and HARQ Feedback Transmission Control," which claims the benefit of and priority to U.S. Provisional Patent Application Ser. No. 62/825,329, filed on Mar. 28, 2019, entitled "MAC Behavior on Multi-PDSCH Reception," with and U.S. Provisional Patent Application Ser. No. 62/842,182, filed on May 2, 2019, entitled "Conditional Acknowledgement Upon Multi-PDSCH Reception," with the contents of all of which are hereby incorporated fully by reference into the present application.

FIELD

The present disclosure generally relates to wireless communications, and more particularly, to methods and apparatuses with multi-Physical Downlink Shared Channel (PDSCH) reception and Hybrid Automatic Repeat reQuest (HARQ)-Acknowledgement (ACK) feedback transmission control.

BACKGROUND

In the next generation (e.g., the fifth generation (5G) New Radio (NR)) wireless communication systems, a User Equipment (UE) may obtain Downlink (DL) assignments by monitoring Physical Downlink Control Channels (PDCCHs) from the network. Each DL assignment may be included in (UE-specific) Downlink Control Information (DCI), which may be found on a PDCCH by blind decoding. DCI may indicate to the UE where the UE can receive DL data on a Physical Downlink Shared Channel (PDSCH) from the network and where the UE can transmit to the network a HARQ-ACK feedback corresponding to the DL data.

In certain use cases such as enhanced Mobile Broadband (eMBB) and Ultra-Reliable and Low Latency Communications (URLLC), the network may schedule two or more PDSCHs to the UE for specific purposes. For example, one scheduled PDSCH may be used for eMBB services and another scheduled PDSCH may be used for URLLC services. In such a multi-PDSCH reception scenario, these two PDSCHs may have different priorities for the UE to process. However, the current HARQ-ACK feedback transmission scheme may not be adequate for UEs operating in such a multi-PDSCH reception scenario.

SUMMARY

The present disclosure is directed to methods and apparatuses with multi-PDSCH reception and HARQ-ACK feedback transmission control.

According to an aspect of the present disclosure, a UE is provided. The UE includes one or more non-transitory computer-readable media having computer-executable instructions embodied thereon and at least one processor coupled to the one or more non-transitory computer-readable media. The at least one processor may be configured to execute the computer-executable instructions to receive a first DL assignment on a first PDCCH. The first DL assignment may determine a first time location of a first time slot including a first resource for transmitting first HARQ-ACK feedback. The at least one processor may be further configured to execute the computer-executable instructions to perform a first DL process in response to receiving the first DL assignment, receive a second DL assignment on a second PDCCH in a time interval between an end of the first PDCCH and a beginning of the first resource, and interrupt the first DL process in response to receiving the second DL assignment. The first DL process may include at least one operation for the UE to generate the first HARQ-ACK feedback.

According to another aspect of the present disclosure, a method performed by a UE is provided. The method includes receiving a first DL assignment on a first PDCCH. The first DL assignment may determine a first time location of a first time slot including a first resource for transmitting first HARQ-ACK feedback. The method further includes performing a first DL process in response to receiving the first DL assignment, receiving a second DL assignment on a second PDCCH in a time interval between an end of the first PDCCH and a beginning of the first resource, and interrupting the first DL process in response to receiving the second DL assignment. The first DL process may include at least one operation for the UE to generate the first HARQ-ACK feedback.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
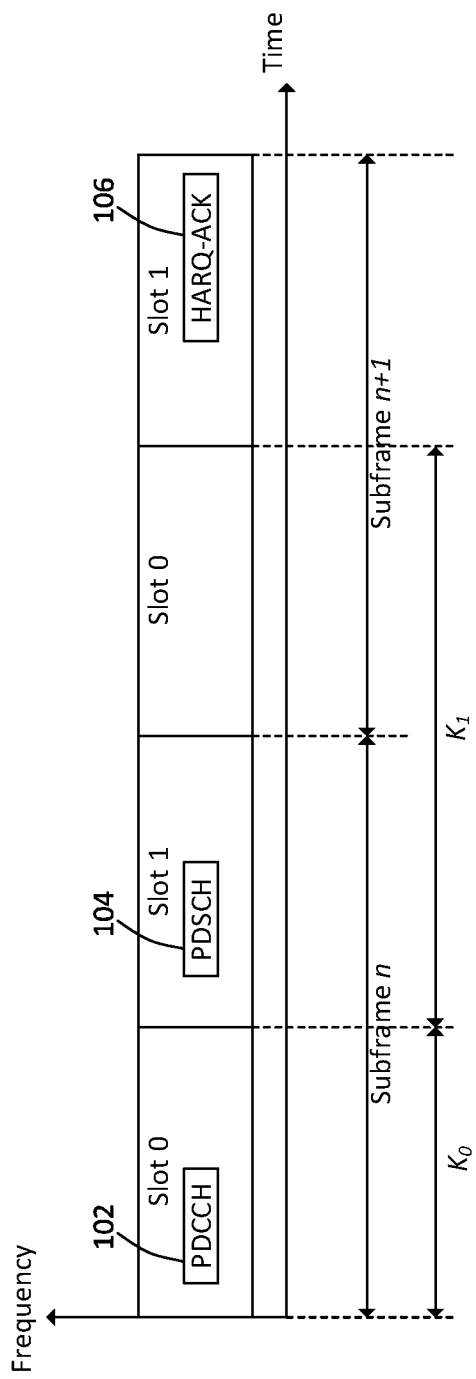
FIG. 1 is a schematic diagram illustrating that a UE determines the resource location of a Physical Downlink Shared Channel (PDSCH) and a resource of a HARQ-ACK feedback transmission based on parameters K0 and K1 received from a Physical Downlink Control Channel (PDCCH), in accordance with an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s).

The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one Base Station (BS), at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS may be operable to provide radio coverage to a specific geographical area using a plurality of cells included in the RAN. The BS supports the operations of the cells.

Each cell may be operable to provide services to at least one UE within its radio coverage. More specifically, each cell (often referred to as a serving cell) may provide services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

FIG. 1 is a schematic diagram illustrating that a UE determines the resource location of a Physical Downlink Shared Channel (PDSCH) and a resource of a HARQ-ACK feedback transmission based on parameters K0 and K1 received from a Physical Downlink Control Channel (PDCCH), in accordance with an example implementation of the present application.

As shown in FIG. 1, the parameter K0 may denote a slot offset between the slot (e.g., slot 0 of subframe n) containing the PDCCH (e.g., PDCCH 102) and the slot (e.g., slot 1 of subframe n) containing the PDSCH (e.g., PDSCH 104) that is indicated/scheduled by DCI carried by the PDCCH (e.g., PDCCH 102). Thus, in the example of FIG. 1, K0=1. On the other hand, the parameter K1 may denote a slot offset between the slot (e.g., slot 1 of subframe n) containing the PDSCH (e.g., PDSCH 104) and the slot (e.g., slot 1 of subframe n+1) that the UE is indicated to perform the HARQ-ACK feedback transmission in the resource 106. In the example of FIG. 1, K1=2. The values of the K0 and K1 parameters may be indicated to the UE via DCI. It should be noted that even though each subframe includes only two slots in the implementation illustrated in FIG. 1, any number of slots may be included in one subframe in some other implementations of the present application. In addition, the number of slots contained in each subframe may be dependent on the numerology of the numerology configuration.

Figure 2:
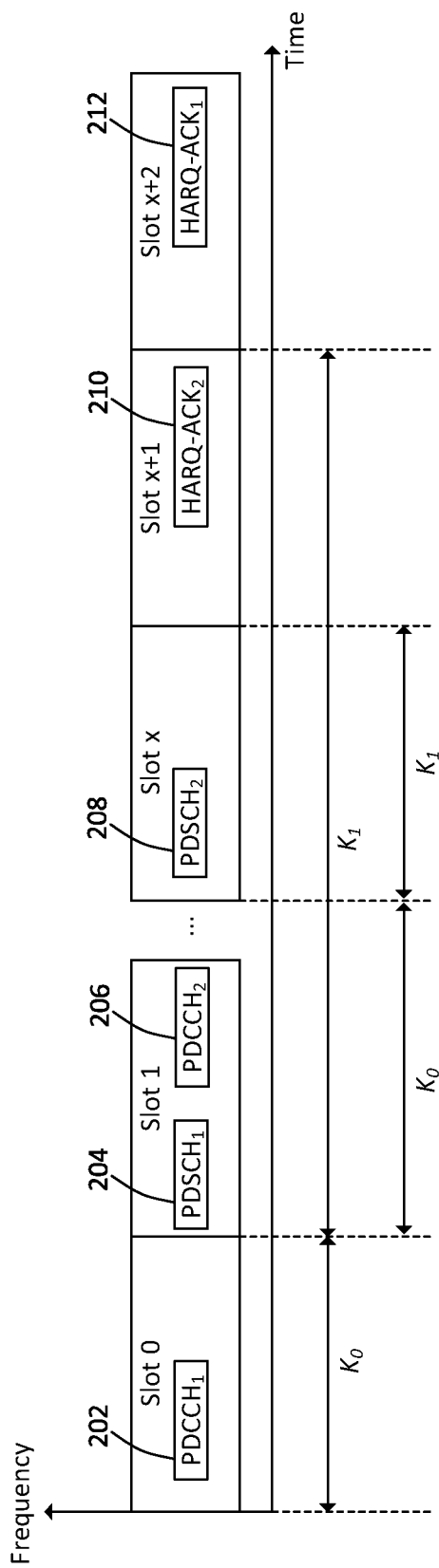
FIG. 2 is a schematic diagram illustrating that a UE determines the resource location of a Physical Downlink Shared Channel (PDSCH) and a resource of a HARQ-ACK feedback transmission based on parameters K0 and K1 received on a Physical Downlink Control Channel (PDCCH), in accordance with an example implementation of the present application.

FIG. 2 is a schematic diagram illustrating that a UE determines the resource location of a Physical Downlink Shared Channel (PDSCH) and a resource of a HARQ-ACK feedback transmission based on parameters K0 and K1 received on a Physical Downlink Control Channel (PDCCH), in accordance with an example implementation of the present application.

In some implementations, when a UE receives a first PDCCH that schedules a first PDSCH reception but the time interval of receiving/processing the first PDSCH overlaps a second PDSCH that is scheduled by a second PDCCH in the time domain. The time interval of receiving/processing the second PDSCH may start from the second PDSCH reception and end at the HARQ-ACK feedback transmission of the second PDSCH (i.e., HARQ-ACK$_2$ feedback).

FIG. 2 is a schematic diagram of multi-PDSCH scheduling in accordance with another example implementation of the present application.

As shown in FIG. 2, a UE may receive PDCCH$_1$ 202 which indicates the reception of PDSCH$_1$ 204 and the transmission of HARQ-ACK$_1$ feedback 212. Before the transmission of HARQ-ACK$_1$ feedback 212, the UE may receive PDCCH$_2$ 206 which indicates the reception of PDSCH$_2$ 208 and the transmission of HARQ-ACK$_2$ feedback 210, where the time location of HARQ-ACK$_2$ feedback 210 is earlier than that of HARQ-ACK$_1$ feedback 212. In such a case, HARQ-ACK$_2$ feedback 210 for PDSCH$_2$ 208 may be considered as an Out of Order (OoO) HARQ-ACK feedback.

In some implementations, the UE is only able to process one downlink unicast grant (e.g., a PDSCH) at a time per serving cell (e.g., due to the UE's limited Demodulation and Decoding (D&D) capability for the PDSCH). For example, as shown in FIG. 2, when the UE is receiving and processing PDSCH$_1$ 204 that is scheduled by PDCCH$_1$ 202, the UE may not be able to use the same D&D resource to process PDSCH$_2$ 208 that is scheduled by PDCCH$_2$ 206, unless the current processing is interrupted/stopped/aborted. That is, the D&D resource of the UE's PHY layer may be occupied by the reception procedure for PDSCH$_1$ 204, and the UE has no extra/enough resources to process PDSCH$_2$ 208 (e.g., to receive PDSCH$_2$ 208, and/or to perform the HARQ process corresponding to PDSCH$_2$ 208), even though the DCI that schedules PDSCH$_2$ 208 has been decoded on PDCCH$_2$ 206. If the current processing for PDSCH$_1$ 204 is needed to be interrupted (e.g., PDSCH$_2$ 208 is used for URLLC services while PDSCH$_1$ 204 is used for eMBB services within a single serving cell), the UE may be not expected to transmit the corresponding HARQ-ACK$_1$ feedback 212 (e.g., ACK/Negative ACK (NACK)) for PDSCH$_1$ at the slot indicated by K1 (e.g., slot x+2).

In the present implementations, the process including at least one operation for the UE for generating the HARQ-ACK feedback may be referred to as a DL process. For example, a first DL process for generating the HARQ-ACK$_1$ feedback 212 may include a reception of PDCCH$_1$ 202 (e.g., in slot 0), a reception of PDSCH$_1$ 204 (e.g., in slot 1), and a transmission of HARQ-ACK$_1$ feedback 212 (e.g., in slot x+2) Similarly, a second DL process for generating the HARQ-ACK$_2$ feedback 210 may include a reception of PDCCH$_2$ 206 (in slot 1), a reception of PDSCH$_2$ 208 (e.g., in slot x), and a transmission of HARQ-ACK$_2$ feedback 210

(e.g., in slot x+1). In some implementations, different DL processes (e.g., the first and second DL process described above) may be performed by the UE with a single serving cell.

Figure 3:
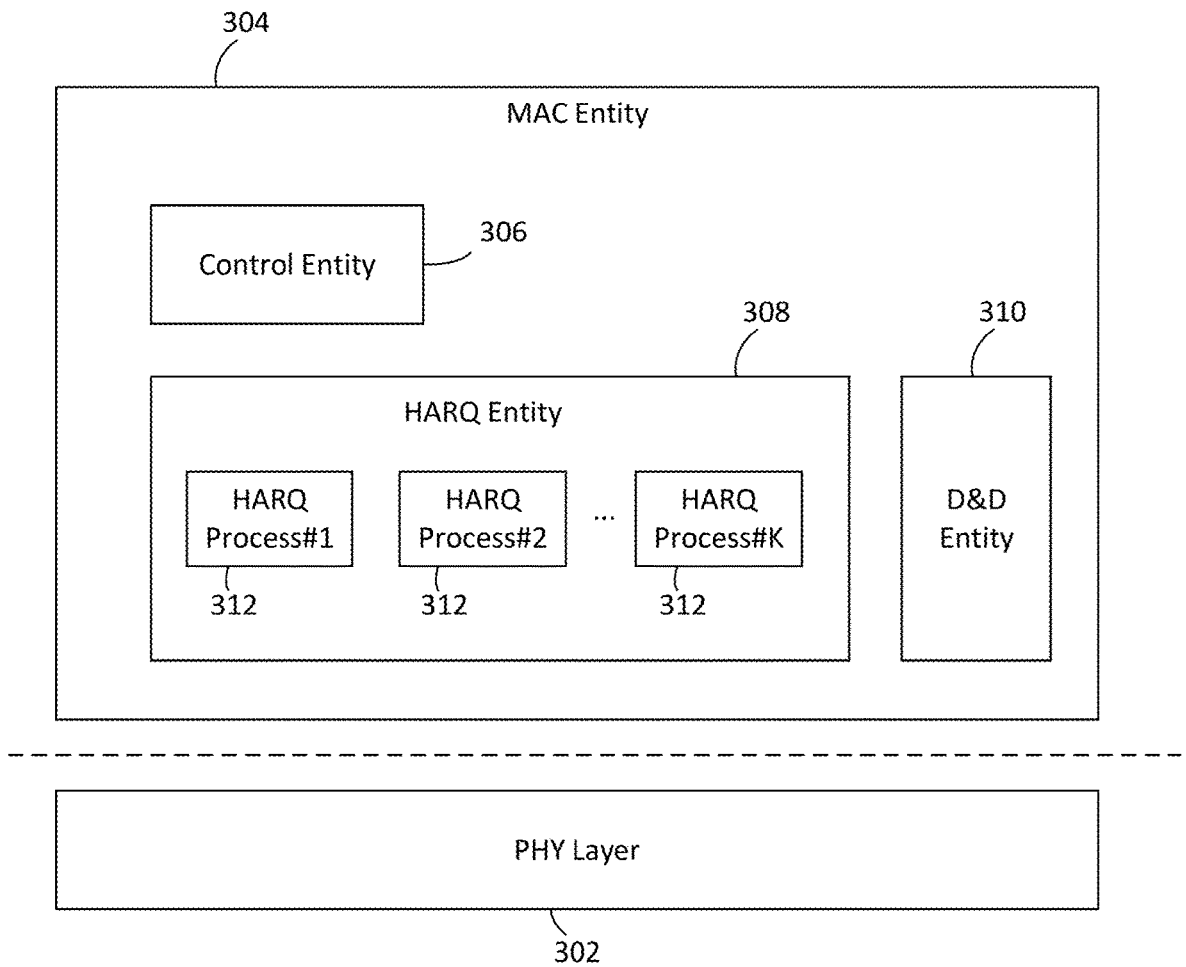
FIG. 3 is a schematic diagram illustrating an architecture of a protocol stack including a Medium Access Control (MAC) entity and a Physical (PHY) layer of a UE, in accordance with an example of the present application.

FIG. 3 is a schematic diagram illustrating an architecture of a protocol stack including a Medium Access Control (MAC) entity and a PHY layer of a UE, in accordance with an example of the present application.

As shown in FIG. 3, the UE may include PHY layer 302 and at least one MAC entity 304 that includes control entity 306, HARQ entity 308 and D&D entity 310. Control entity 306 may represent the MAC entity/layer of the UE except HARQ entity 308 and D&D entity 310. HARQ entity 308 may maintain K HARQ processes 312 (e.g., HARQ processes#1 to HARQ processes#K, where K is an integer) with each HARQ process 312 corresponding to a HARQ process Identity (ID). D&D entity 310 may be responsible for disassembling and demultiplexing the received MAC PDU. It should be noted that the term "HARQ process ID" and the term "HARQ ID" may be interchangeable in some implementations of the present application.

It should be noted that the implementation in FIG. 3 is shown for illustrative purposes only, and is not mean to limit the scope of the present application. For example, in some other implementations, more or less entities in the UE may be engaged in the processing of the DL process.

Figure 4:
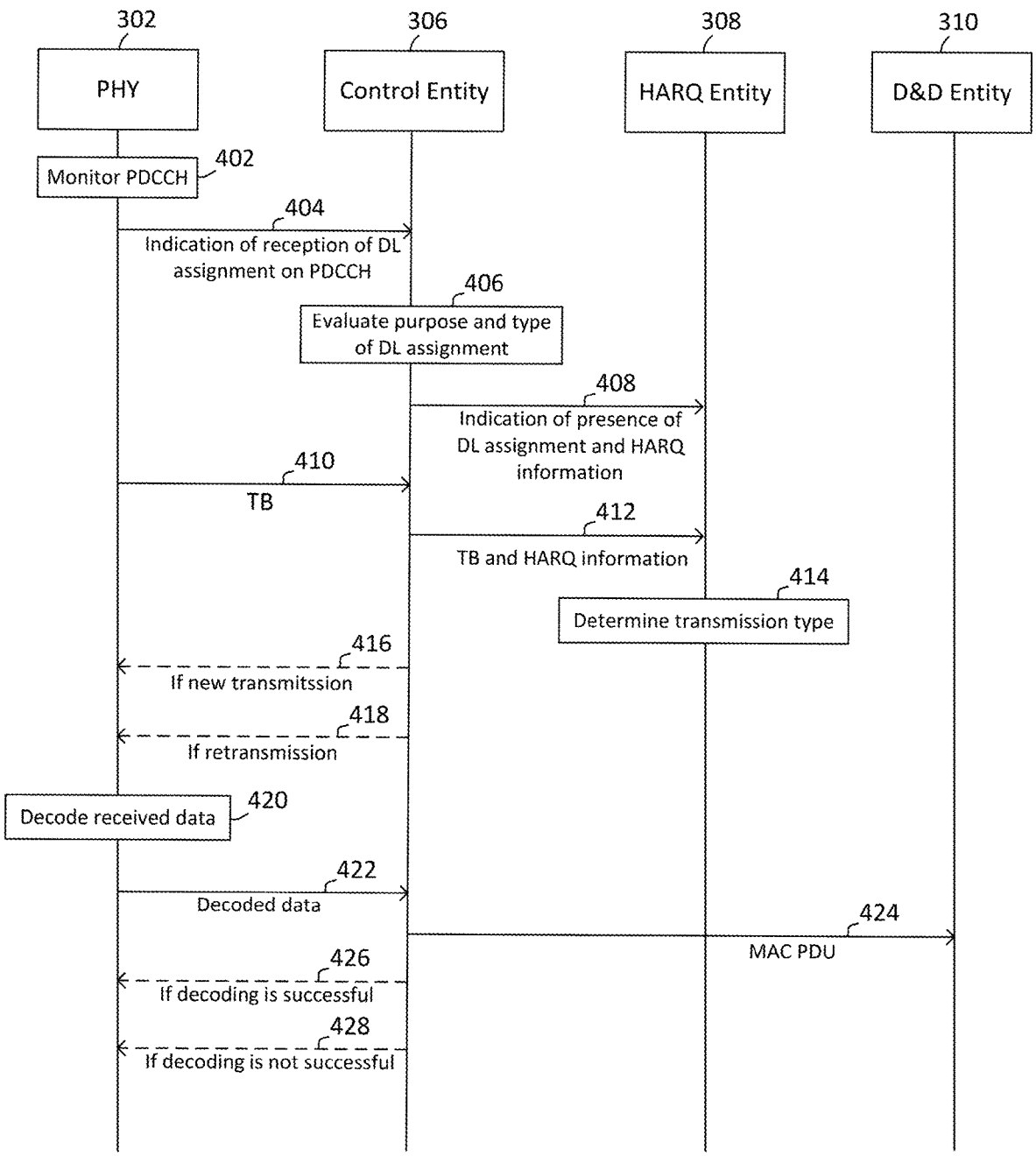
FIG. 4 is a flowchart of a Downlink (DL) process performed by a UE, in accordance with an example implementation of the present application.

FIG. 4 is a flowchart of a DL process performed by a UE, in accordance with an example implementation of the present application. For the convenience of discussion and illustration, the entities included in the protocol stack of the UE illustrated in FIG. 3 are shown in FIG. 4 with the same label.

In action 402 (Step 1), PHY layer 302 of the UE may monitor PDCCH candidates according to the gNB's configuration and thus obtain a DL assignment from a PDCCH by decoding DCI (e.g., with Cyclic Redundancy Check (CRC) scrambled by a specific Radio Network Temporary Identifier (RNTI) for the UE (e.g., a Cell-RNTI (C-RNTI))) on the PDCCH. In some implementations, the UE may use the DL assignment to determine the time location of the time slot including the PDSCH and/or the time location of the time slot including the resource for transmitting the HARQ-ACK feedback. For example, the DL assignment may include K0 and K1 parameters.

In action 404 (Step 2), PHY layer 302 may provide an indication of the reception of the DL assignment on the PDCCH to the MAC layer of the UE (e.g., control entity 306 of MAC entity 304 illustrated in FIG. 3). In some implementations, the indication of the reception of the DL assignment may include a PDSCH reception assignment (e.g., indicated by the DL assignment) and HARQ information that contains a New Data Indicator (NDI).

In action 406 (Step 3), control entity 306 of the UE may evaluate the purpose and type of the DL assignment based on the indication of the reception of the DL assignment from PHY layer 302. For example, the MAC entity may determine whether the DL assignment is for the MAC entity's C-RNTI, and/or whether the NDI has been toggled.

In action 408 (Step 4), control entity 306 of the UE may inform HARQ entity 308 of the presence of the DL assignment and provide the HARQ information (e.g., including a HARQ process ID) to HARQ entity 308.

In action 410 (Step 5), at a time after the end of the PDSCH reception (e.g., the end of the last symbol of the PDSCH in the time domain), PHY layer 302 may provide a Transport Block (TB) received on the PDSCH to the MAC layer of the UE (e.g., control entity 306 of MAC entity 304).

In action 412 (Step 6), control entity 306 may provide the TB and the HARQ information that indicates a HARQ process (e.g., HARQ process 312 illustrated in FIG. 3) to HARQ entity 308.

In action 414 (Step 7), HARQ entity 308 may determine the transmission type of the TB (e.g., retransmission or new transmission). For example, when performing the HARQ process, HARQ entity 308 may determine whether the NDI has been toggled and whether the DL assignment is a new transmission.

If the DL assignment is determined as a new transmission in action 414, then in action 416 (Step 8), control entity 306 (of MAC entity 304) may instruct PHY layer 302 to decode the received data.

If the DL assignment is determined as a retransmission in action 414 and the received data has not been successfully decoded by PHY layer 302, then in action 418 (Step 8'), control entity 306 (of MAC entity 304) may instruct PHY layer 302 to perform a soft combining process in which PHY layer 302 may combine the received data with the data currently stored in a soft buffer for this TB and then attempt to decode the combined data.

In action 420 (Step 9), PHY layer 302 may decode the received data according to the instruction of control entity 306, and then in action 422, provide the decoded data to the MAC layer of the UE (e.g., control entity 306).

In action 424 (Step 10), if the received data is successfully decoded in action 420 (Step 9), the MAC layer of the UE (e.g., control entity 306) may provide the MAC Protocol Data Unit (PDU) corresponding to the decoded data to D&D entity 310. For example, D&D entity 310 may disassemble and demultiplex the MAC PDU.

In addition, if the received data is successfully decoded in action 420, the MAC layer of the UE (e.g., control entity 306) may further instruct PHY layer 302 layer to generate the HARQ-ACK feedback (e.g., ACK/NACK) of the received data in this TB in action 426 (Step 11).

Conversely, if the received data is not successfully decoded in action 420, the MAC layer of the UE (e.g., control entity 306) may instruct PHY layer 302 to replace the data stored in the soft buffer with the data that the MAC entity instructs PHY layer 302 to decode. Then, the MAC layer of the UE (e.g., control entity 306) may instruct PHY layer 302 to generate the HARQ-ACK feedback in the data in this TB in action 428 (Step 11').

It should be noted that although actions 402, 404, 406, 408, 410, 412, 414, 416, 418, 420, 422, 424, 426 and 428 are delineated as separate actions in FIG. 4, these separately delineated actions should not be construed as necessarily order dependent. The order in which the actions are performed in FIG. 4 is not intended to be construed as a limitation, and any number of the described actions may be combined in any order to implement the method, or an alternate method. Moreover, one or more of actions 402, 404, 406, 408, 410, 412, 414, 416, 418, 420, 422, 424, 426 and 428 in the DL process may be omitted in some of the present implementations. For example, action 410 (Step 5) may be combined with, or merged into, action 404 (Step 2). In such a case, the PHY layer of the UE may deliver/provide the DL assignment and the corresponding HARQ information, as well as the received TB, to the MAC entity after the UE receives the PDSCH.

In an example multi-PDSCH reception scenario illustrated in FIG. 2, the UE may perform a first DL process for generating HARQ-ACK$_1$ feedback 212 after receiving PDCCH$_1$ 202 in slot 0. However, if the UE receives PDSCH$_2$ 208, which is not scheduled by PDCCH$_1$ 202, during the first DL process, the PHY, MAC and HARQ entities of the UE may need to know how to handle the ongoing first DL process and the second DL process related to PDSCH$_2$ 208. To this end, some implementations of the present application provide solutions to the UEs operating in the multi-PDSCH reception scenario described above. It should be noted that the DL process illustrated in FIG. 4 may be applied to each of the first DL process and the second DL process described above.

In some implementations, the detailed behaviors of the PHY, MAC and HARQ entities of the UE may be determined based on the time point when the UE decides to interrupt the first DL process, the time point when the UE receives a PDSCH (e.g., PDSCH$_2$ 208), the time point when the UE is expected to transmit the corresponding HARQ-ACK feedback (e.g., HARQ-ACK$_2$ feedback 212), etc.

Figure 5:
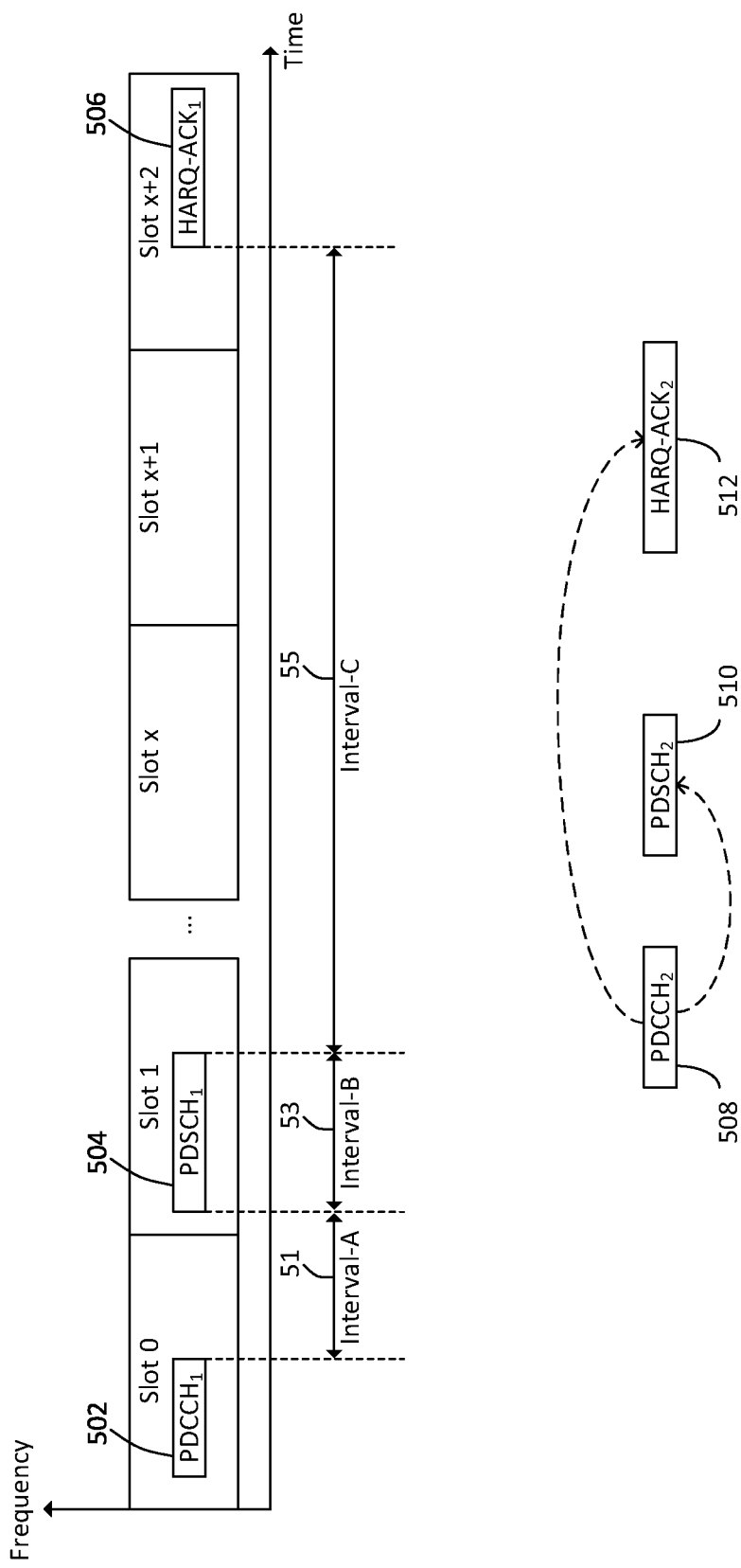
FIG. 5 shows time intervals in which a UE is likely to receive another Physical Downlink Control Channel (PDCCH) during a first DL process, in accordance with an example implementation of the present application.

FIG. 5 shows time intervals in which a UE is likely to receive another PDCCH during a first DL process. As shown in FIG. 5, the entire first DL process may include the reception of PDCCH$_1$ 502, the reception of PDSCH$_1$ 504, and the transmission of HARQ-ACK$_1$ feedback 506. In such a case, when the UE receives another PDCCH (e.g., PDCCH$_2$ 508) in Interval-A 51, Interval-B 53 or Interval-C 55, the UE's behaviors may be affected. In addition, the location of another PDSCH (e.g., PDSCH$_2$ 510) that is scheduled by PDCCH$_2$ 508 may also affect the UE's behaviors. Examples of the UE's behaviors in response to the PDCCH/PDSCH receptions that occur in different time intervals (e.g., Interval-A 51, Interval-B 53 or Interval-C 55) are described in Case 1, Case 2 and Case 3 described below. It should be noted that the implementation in FIG. 5 is shown for illustrative purposes only, and is not meant to limit the scope of the present disclosure. The slot offsets between any two of PDCCH$_1$ 502, PDSCH$_1$ 504 and HARQ-ACK$_1$ feedback 506 may vary depending on, for example, the scheduling of the gNB.

In FIG. 5, Interval-A 51 may be the time interval starting from the end of the last symbol of PDCCH$_1$ 502 and ending at the beginning of the first symbol of PDSCH$_1$ 504; Interval-B 53 may be the time interval starting from the beginning of the first symbol of PDSCH$_1$ 504 and ending at the end of the last symbol of PDSCH$_1$ 504; Interval-C 55 may be the time interval starting from the end of the last symbol of PDSCH$_1$ 504 and ending at the beginning of the first symbol of the (potential) resource of the transmission of HARQ-ACK$_1$ feedback 506. For the convenience of discussion and illustration, the entire first DL process described in Case 1, Case 2 or Case 3 may be exemplified by the DL process illustrated in FIG. 4. For example, Steps 1, 2, 3, 4, 5, 6, 7, 8, 8', 9, 10, 11, 11' of the first DL process may correspond to actions 402, 404, 406, 408, 410, 412, 414, 416, 418, 420, 424, 426 and 428 of the DL process illustrated in FIG. 4, respectively.

Case 1. PDCCH$_2$ 508 is transmitted by the gNB to the UE within Interval-A 51, or the end of the last symbol of PDCCH$_2$ 508 is earlier than the beginning of the first symbol of PDSCH$_1$ 502.

Sub-case 1-1. The beginning of the first symbol of PDSCH$_2$ 510 is within the Interval-A.

In Sub-case 1-1, the first PD process performed by the UE may be proceeding to one of Steps 2 to 4 when the UE receives PDSCH$_2$ 508, and one or more of the following options may be performed by the UE:

Option 1: If the UE receives a DL assignment received on PDCCH$_2$ 508 (which is referred to as a second DL assignment) before Step 2 of the first DL process, the PHY layer of the UE may only indicate the DL assignment received on PDCCH$_1$ 502 (which is referred to as a first DL assignment) to the MAC entity of the UE.

Option 2: If the MAC entity of the UE is indicated with the second DL assignment by the PHY layer during a time interval after Step 2 and before Step 4 of the first DL process, the MAC entity may interrupt/stop the first DL process immediately (no matter which step of the first DL process has performed by the UE). For example, the first DL process may stop at Step 4 because the MAC entity of the UE may neither indicate the presence of the first DL assignment to the HARQ entity nor deliver the HARQ information of the first DL process to the HARQ entity. In such a case, the MAC entity of the UE may not expect to receive the TB for the first DL process.

Option 3: If the MAC entity of the UE is indicated with the second DL assignment by the PHY layer during a time interval after Step 4 and before Step 5 of the first DL process, the MAC entity may not expect to receive the TB for the first DL process.

Option 4: The MAC entity may not expect to receive the TB for the first DL process.

In some implementations, the condition of "the MAC entity of the UE being indicated with the second DL assignment by the PHY layer," which is described in the listed options, may be replaced by one of the following conditions:

Conditions 1: The MAC entity is explicitly indicated by the PHY layer to interrupt the first DL process.

Conditions 2: The MAC entity is indicated by the PHY layer with a particular DL assignment that indicates the HARQ information but does not contain any information about the transmission of the PDSCH (e.g., the time and/or frequency resource location of the PDSCH).

Conditions 3: Once the PHY layer of the UE receives a DL assignment on a PDCCH, the MAC entity of the UE is indicated by the PHY layer with limited information related to the NDI value and the HARQ process number.

In some implementations, methods are provided to deal with an inconsistency issue between the UE and the gNB. For example, if the MAC entity immediately interrupts the first DL process after being indicated with the second DL assignment by the PHY layer, the HARQ information may have not been delivered to the HARQ entity yet. However, the gNB may wrongly consider that the NDI value of the first DL process has been delivered by the MAC entity to the HARQ entity/process. Such an inconsistence issue may cause wrong toggling evaluation for a new DL assignment which indicates the same HARQ process. In view of this, in some implementations, the UE may adopt at least one of the following options to handle the inconsistency issue:

Option 1: If the PHY layer of the UE receives the second DL assignment before Step 2 of the first DL process, the PHY layer may provide the first DL assignment and the corresponding HARQ information to the MAC entity. The MAC entity may store/deliver the NDI (or the complete HARQ information) to the HARQ entity/process. In addition, the MAC entity may instruct to the HARQ entity/process to interrupt (or not to perform) the first DL process.

Option 2: If the MAC entity of the UE is indicated with the second DL assignment by the PHY layer after Step 2 and before Step 4 of the first DL process, the MAC entity may interrupt the first DL process immediately. For example, the MAC entity may not indicate the presence of the first DL assignment to the HARQ entity. The MAC entity may store/deliver the NDI (or the complete HARQ information) to the HARQ entity/process. In addition, the MAC entity may instruct to the HARQ entity/process to interrupt (or not to perform) the first DL process. In this case, the MAC entity may not expect to receive the TB for the first DL process.

Option 3: If the MAC entity is indicated with the second DL assignment by the PHY layer in a time interval after Step 4 and before Step 5 of the first DL process, the MAC entity may instruct the HARQ entity to stop the corresponding HARQ process of the first DL process, and/or to release the corresponding HARQ process. The MAC entity may store the NDI or the complete HARQ information, and/or instruct the HARQ entity/process to store the NDI or the complete HARQ information when the HARQ process is interrupted. In some implementations, the HARQ entity of the UE may stop the corresponding HARQ process of the first DL process and/or release the corresponding HARQ process after receiving the second DL assignment and/or the corresponding HARQ information.

Option 4: The HARQ process of the first DL process may be treated as finished/completed by the UE.

Option 5: The HARQ process of the first DL process may be treated as a non-given HARQ process by the UE.

Option 6: The soft buffer of the first DL process may be flushed by the UE.

Option 7: The MAC entity may instruct the PHY layer to flush the soft buffer of the first DL process.

Option 8: The UE may set the value of the NDI of the HARQ process of the first DL process to a particular value (e.g., which is difference from "1" or "0") or a particular status (e.g., NULL).

Option 9: The UE may set the value of the NDI of the HARQ process of the first DL process to "1."

Option 10: The UE may set the value of the NDI of the HARQ process of the first DL process to "0."

Examples of the UE's behaviors are described in the text proposals shown in Tables 1.1-1, 1.1-2, 1.1-3 and 1.1-4.

TABLE 1.1-1

5.3.1  DL Assignment reception
Downlink assignments received on the PDCCH both indicate that there is a transmission on a DL-SCH for a particular MAC entity and provide the relevant HARQ information.
When the MAC entity has a C-RNTI, Temporary C-RNTI, or CS-RNTI, the MAC entity shall for each PDCCH occasion during which it monitors PDCCH and for each Serving Cell:
    1>if a downlink assignment for this PDCCH occasion and this Serving Cell has been received on the PDCCH for the MAC entity's C-RNTI, or Temporary C-RNTI:
        2>if this is the first downlink assignment for this Temporary C-RNTI:
            3>consider the NDI to have been toggled.
        2>if the downlink assignment is for the MAC entity's C-RNTI, and if the previous downlink assignment indicated to the HARQ entity of the same HARQ process was either a downlink assignment received for the MAC entity's CS-RNTI or a configured downlink assignment:
            3>consider the NDI to have been toggled regardless of the value of the NDI.
        2>indicate the presence of a downlink assignment and deliver the associated HARQ information to the HARQ entity.
The MAC entity will skip an indication of a presence of a downlink assignment and deliver the associated HARQ information to the HARQ entity once a later downlink assignment is received on PDCCH for the MAC entity's C-RNTI before the downlink assignment indication and the HARQ information deliver; or
The MAC entity will skip an indication of a presence of a downlink assignment and deliver the associated HARQ information to the HARQ entity once an interrupt indication for the downlink assignment is received from lower layer; or
The MAC entity will indicate the HARQ entity to cancel the processing of an indicated downlink assignment once an interrupt indication for the downlink assignment is received from lower layer; or
The MAC entity will indicate the HARQ entity to cancel the processing of an indicated downlink assignment once a later downlink assignment is received on PDCCH for the MAC entity's C-RNTI before the corresponding HARQ process attempt to decode the received data; or
The MAC entity will indicate the HARQ entity to cancel the processing of an indicated downlink assignment once a later downlink assignment is received on PDCCH for the MAC entity's C-RNTI before the corresponding HARQ process instruct the physical layer to generate acknowledgement;

TABLE 1.1-2

5.3.2.1  HARQ Entity
The MAC entity includes a HARQ entity for each Serving Cell, which maintains a number of parallel HARQ processes. Each HARQ process is associated with a HARQ process identifier. The HARQ entity directs HARQ information and associated TBs received on the DL-SCH to the corresponding HARQ processes.
The number of parallel DL HARQ processes per HARQ entity is specified in TS 38.214. The dedicated broadcast HARQ process is used for BCCH.
The MAC entity shall:
    1>if a downlink assignment has been indicated:
        2>allocate the TB(s) received from the physical layer and the associated HARQ information to the HARQ process indicated by the associated HARQ information.
    1>if a downlink assignment with a ealier HARQ feedback requiremnet than a downlink assignment had been indicated; or
    1> if an interrupt indication for a downlink assignment is received from lower layer
        2> skip to allocate the TB(s) received from the physical layer and the associated HARQ information to the HARQ process other than the downlink assignment with earliest HARQ feedback requiremnet; or

TABLE 1.1-2-continued

2> indicate the HARQ process to interrupt the processing of an indicated downlink assignment;
1>if a downlink assignment has been indicated for the broadcast HARQ process:
2>allocate the received TB to the broadcast HARQ process.

TABLE 1.1-3

5.3.2.1   HARQ Entity
The MAC entity includes a HARQ entity for each Serving Cell, which maintains a number of parallel HARQ processes. Each HARQ process is associated with a HARQ process identifier. The HARQ entity directs HARQ information and associated TBs received on the DL-SCH to the corresponding HARQ processes.
The number of parallel DL HARQ processes per HARQ entity is specified in TS 38.214. The dedicated broadcast HARQ process is used for BCCH.
The MAC entity shall:
1>if a downlink assignment has been indicated:
2>allocate the TB(s) received from the physical layer and the associated HARQ information to the HARQ process indicated by the associated HARQ information.
1>if a downlink assignment has been indicated for the broadcast HARQ process:
2>allocate the received TB to the broadcast HARQ process.
Once a downlink assignment with a ealier HARQ feedback requiremnet than a downlink assignment had been indicated or an interrupt indication for a downlink assignment is received from lower layer, it is left to UE implementation to process the indicated downlink assignment.

TABLE 1.1-4

5.3.2.1   HARQ Entity
The MAC entity includes a HARQ entity for each Serving Cell, which maintains a number of parallel HARQ processes. Each HARQ process is associated with a HARQ process identifier. The HARQ entity directs HARQ information and associated TBs received on the DL-SCH to the corresponding HARQ processes.
The number of parallel DL HARQ processes per HARQ entity is specified in TS 38.214. The dedicated broadcast HARQ process is used for BCCH.
The MAC entity shall:
1>if a downlink assignment has been indicated:
2>allocate the TB(s) received from the physical layer and the associated HARQ information to the HARQ process indicated by the associated HARQ information.
1>if a downlink assignment with a ealier HARQ feedback requiremnet than a downlink assignment had been indicated; or
1> if an interrupt indication for a downlink assignment is received from lower layer
2> Indicates the HARQ process to set the value NDI as 1; or
2> Indicates the HARQ process to set the value NDI as 0; or
2> Indicates the HARQ process to set the value NDI as NULL;
1>if a downlink assignment has been indicated for the broadcast HARQ process:
2>allocate the received TB to the broadcast HARQ process.

In some implementations, the MAC entity of the UE may determine whether the NDI of a HARQ process of a DL process is toggled based on whether the previous DL assignment indicated to the HARQ entity of the same HARQ process is interrupted/stopped. An Example of the UE's behavior described above is illustrated in the text proposal shown in Table 1.1-5.

TABLE 1.1-5

5.3.1   DL Assignment reception
Downlink assignments received on the PDCCH both indicate that there is a transmission on a DL-SCH for a particular MAC entity and provide the relevant HARQ information.
When the MAC entity has a C-RNTI, Temporary C-RNTI, or CS-RNTI, the MAC entity shall for each PDCCH occasion during which it monitors PDCCH and for each Serving Cell:
1>if a downlink assignment for this PDCCH occasion and this Serving Cell has been received on the PDCCH for the MAC entity's C-RNTI, or Temporary C-RNTI:
2>if this is the first downlink assignment for this Temporary C-RNTI:
3>consider the NDI to have been toggled.
2>if the downlink assignment is for the MAC entity's C-RNTI, and if the previous downlink assignment indicated to the HARQ entity of the same HARQ process was either a downlink assignment received for the MAC entity's CS-RNTI or a configured downlink assignment; or
2> if the downlink assignment is for the MAC entity's CS-RNTI, and if the previous downlink assignment indicated to the HARQ entity of the same HARQ process was interrupted; or
2> if the downlink assignment is for the MAC entity's MCS-C-RNTI, and if the previous downlink assignment indicated to the HARQ entity of the same HARQ TABLE 1.1-5-continued process was interrupted; or
2> if the downlink assignment is for the MAC entity's specific RNTI (which applied for a downlink unicast scheduling), and if the previous downlink assignment indicated to the HARQ entity of the same HARQ process was interrupted; or
2> if the downlink assignment is for the MAC entity's C-RNTI, and if the previous downlink assignment indicated to the HARQ entity of the same HARQ process was interrupted:
3>consider the NDI to have been toggled regardless of the value of the NDI.
2>indicate the presence of a downlink assignment and deliver the associated HARQ information to the HARQ entity.

Sub-case 1-2. The beginning the first symbol of the $PDSCH_2$ 510 is within Interval-B 53.

In Sub-case 1.2, the first PD process performed by the UE may be proceeding to one of Steps 2 to 4 when the UE receives $PDSCH_2$ 508. Hence, the UE's behaviors that are introduced in Sub-case 1-1 may be applicable to Sub-case 1.2. In some implementations, the PHY layer of the UE may stop the reception of the TB of the first DL process and/or may not provide the TB to the MAC entity. Also, the MAC entity may not expect to receive the TB for the first DL process.

Sub-case 1.3. The beginning the first symbol of the $PDSCH_2$ 510 is within Interval-C 55.

In Sub-case 1.3, the first PD process performed by the UE may be proceeding to one of Steps 2 to 11/11' when the UE receives $PDSCH_2$ 508. Hence, the UE's behaviors that are introduced in Sub-case 1-1 may be applicable to Sub-case 1.3. In some implementations, the PHY layer of the UE may stop the reception of the TB of the first DL process and may not provide the TB to the MAC entity. Thus, the MAC entity may not expect to receive the TB for the first DL process. In Sub-case 1.3, the UE may adopt at least one of the following options:

Option 1: If the MAC entity is indicated with the second DL assignment by the PHY layer in a time interval after Step 5 and before Step 6 of the first DL process, the MAC entity may immediately interrupt/stop the first DL process (no matter which step of the first DL process has performed by the UE). Thus, in Option 1, the UE may not perform Steps 6 to 11 of the first DL process.

Option 2: If the MAC entity is indicated with the second DL assignment by the PHY layer after Step 6 and before Step 7 of the first DL process, the MAC entity may immediately interrupt/stop the first DL process (no matter which step of the first DL process has performed by the UE). Thus, in Option 2, the UE may not perform Steps 6 to 11 of the first DL process. For example, the HARQ entity of the UE may not perform the NDI toggle evaluation in Step 7.

Option 3: If the MAC entity is indicated with the second DL assignment by the PHY layer after Step 7 and before Step 8 of the first DL process, the MAC entity may immediately interrupt/stop the first DL process (no matter which step of the first DL process has performed by the UE). Thus, in Option 3, the UE may not perform Steps 8 to 11 of the first DL process. However, the MAC entity may still attempt to decode the received data after the second DL process (e.g., including the reception of $PDCCH_2$ 508, the reception of $PDSCH_2$ 510, and the transmission of the corresponding HARQ-ACK feedback) is completed. In some implementations, the MAC entity may attempt to decode the received data and adopt at least one of the following options if the decoding process is successful. The MAC entity may (only) instruct the PHY layer to combine the received data with the data currently stored in the soft buffer.

Option 1: if the MAC entity is indicated with the second DL assignment by the PHY layer in a time interval after Step 8 and before Step 11 of the first DL process, the MAC entity may immediately interrupt/stop the first DL process (no matter which step of the first DL process has performed by the UE). Thus, the MAC entity may not perform Steps 8 to 11 of the DL process. However, the MAC entity may still attempt to decode the received the data after the second DL process is completed. In some implementations, the MAC entity may attempt to decode the received data and adopt the following option if the decoding is successful. The MAC entity may only instruct the PHY layer to combine the received data with the data currently stored in the soft buffer.

Option 1: The MAC entity may store the NDI (or the complete HARQ information) or instruct the HARQ entity/process to store the NDI (or the complete HARQ information) when the HARQ process is interrupted.

Case 2. $PDCCH_2$ 508 is transmitted by the gNB to the UE within Interval-B 53, or the end of the last symbol of $PDCCH_2$ 508 transmission is later than the beginning of the first symbol of the transmission of $PDSCH_1$ 504 and earlier than the end of the last symbol of the transmission of $PDSCH_1$ 504.

Sub-case 2.1. The beginning of the first symbol of $PDSCH_2$ 510 is within Interval-B 53.

In Sub-case 2-1, the first PD process performed by the UE may be proceeding to one of Steps 2 to 4 when the UE receives $PDSCH_2$ 508. Hence, the behaviors introduced in Sub-case 1.1 or 1.2 may be applicable to Sub-case 2-1. In addition, the PHY layer of the UE may stop the reception of the TB of the first DL process and may not provide the TB to the MAC entity of the UE. The MAC entity may not expect to receive the TB for the first DL process.

Sub-case 2.2. The beginning of the first symbol of $PDSCH_2$ 510 is within Interval-C 55.

In Sub-case 2-2, the first PD process performed by the UE may be proceeding to one of Steps 2 to 11/11' when the UE receives $PDSCH_2$ 508. Hence, the behaviors introduced in Sub-case 1.1, 1.2 or 1.3 may be applicable to Sub-case 2-2. The PHY layer may stop the reception of the TB of the first DL process and may not provide the TB to the MAC entity. The MAC entity may not expect to receive the TB for the first DL process.

Case 3. $PDCCH_2$ 508 is transmitted by the gNB to the UE within Interval-C 55, or the end of the last symbol of $PDCCH_2$ 508 is later than the end of the last symbol of $PDSCH_1$ 504 and earlier than the beginning of the first symbol of the transmission of the $HARQ-ACK_1$ feedback 506.

In Case 3, $PDSCH_2$ 508 may be transmitted within Interval-C 55. In other words, the time duration of $PDSCH_2$ 508 is within Interval-C 55. Thus, the first PD process performed by the UE may be proceeding to one of Steps 2 to 11/11' when the UE receives $PDSCH_2$ 508. Hence, the behaviors introduced in the Sub-case 1.1, 1.2, 1.3, 2.1 or 2.2 may be applicable to Case 3. The PHY later may stop the reception of the TB of the first DL process and may not provide the TB to the MAC entity of the UE. In addition, the MAC entity may not expect to receive the TB for the first DL process.

In some implementations, each case described above may be performed by the UE when at least one of the following conditions is satisfied:

Condition 1: The first and/or second DL assignment is scrambled by a specific RNTI.

Condition 2: The first and/or second DL assignment is configured for a new transmission or for a retransmission;

Condition 3: The first and/or second DL process is configured with repetition (e.g., one or more copies of TB of the first and/or second DL process are configured to be received by the UE).

Condition 4: The time interval between any two of $PDCCH_1$ 502, $PDCCH_2$ 508, $PDSCH_1$ 504, $PDSCH_2$ 510, the resource for transmitting $HARQ-ACK_1$ feedback 506, and the resource for transmitting $HARQ-ACK_2$ feedback 512 is larger or smaller than a predefined value, where the predefined value may depend on the UE's capability and/or the service type of each of the first and second DL assignments.

Condition 5: One or more explicitly or implicitly indications contained in the first and/or second DL assignment.

Condition 6: Whether the first and/or second DL process applied a same HARQ process ID.

Figure 6:
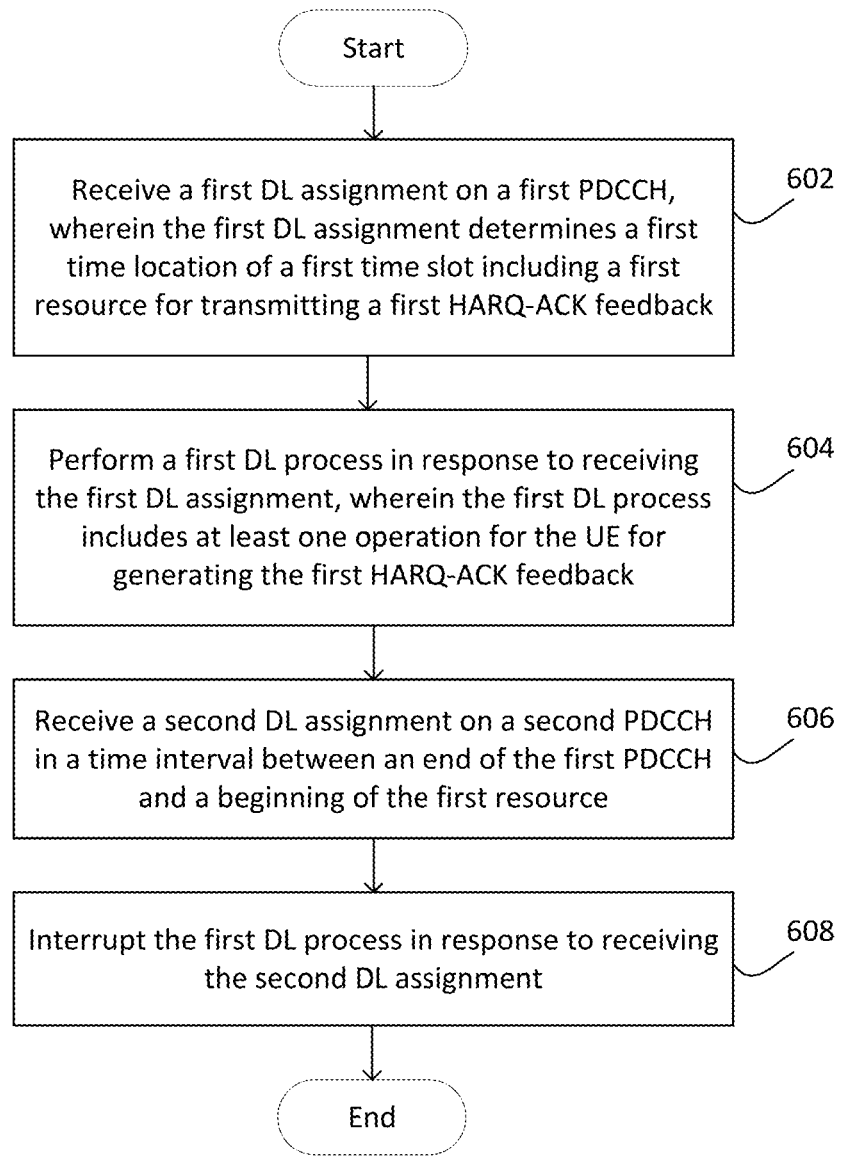
FIG. 6 is a flowchart of a method performed by a UE, in accordance with an example implementation of the present application.

FIG. 6 is a flowchart of a method performed by a UE in accordance with an example implementation of the present application.

In action 602, a UE may receive a first DL assignment (e.g., included in DCI) on a first PDCCH (e.g., $PDCCH_1$ 202 illustrated in FIG. 2 or $PDCCH_1$ 502 illustrated in FIG. 5). The first DL assignment may be used to determine or indicate a first time location of a first time slot including a first resource for transmitting a first HARQ-ACK feedback (e.g., $HARQ-ACK_1$ feedback 212 illustrated in FIG. 2 or $HARQ-ACK_1$ feedback 506 illustrated in FIG. 5).

In action 604, the UE may perform/start a first DL process in response to receiving the first DL assignment. The first DL process may include at least one operation for the UE for generating the first HARQ-ACK feedback Taking FIG. 5 as an example, the entire first DL process may include the reception of $PDSCH_1$ 504 and the transmission of the $HARQ-ACK_1$ feedback 506. In some implementations, the entire first DL process may include one or more of the actions/steps of the DL process illustrated in FIG. 4.

In action 606, the UE may receive a second DL assignment (e.g., included in DCI) on a second PDCCH (e.g., $PDCCH_2$ 206 illustrated in FIG. 2 or $PDCCH_2$ 508 illustrated in FIG. 5) in a time interval between an end of the first PDCCH and a beginning of the first resource (e.g., the time interval from the beginning of Interval-A 51 to the end of Interval-C 55 illustrated FIG. 5).

In some implementations, the UE may determine a second time location of a second time slot including a second resource for transmitting a second HARQ-ACK feedback (e.g., $HARQ-ACK_2$ feedback 210 illustrated in FIG. 2 or $HARQ-ACK_2$ feedback 512 illustrated in FIG. 5) based on the second DL assignment, where the second time location of the second resource may be earlier than the first time location of the first resource in the time domain.

In action 608, the UE may interrupt the first DL process in response to receiving the second DL assignment. For example, the UE may interrupt the first DL process at one of Steps 2 to 11/11' of the first DL process, depending on the time point when the UE receives the second DL assignment and/or the time location of a second PDSCH (e.g., $PDSCH_2$ 208 illustrated in FIG. 2 or $PDSCH_2$ 510 illustrated in FIG. 5) indicated by the second DL assignment. In some implementations, the MAC entity of the UE (e.g., control entity 306 illustrated in FIG. 3 or 4) may instruct the HARQ entity of the UE (e.g., HARQ entity 308 illustrated in FIG. 3 or 4) to cancel processing for the first DL assignment and interrupt the first DL process.

Figure 7:
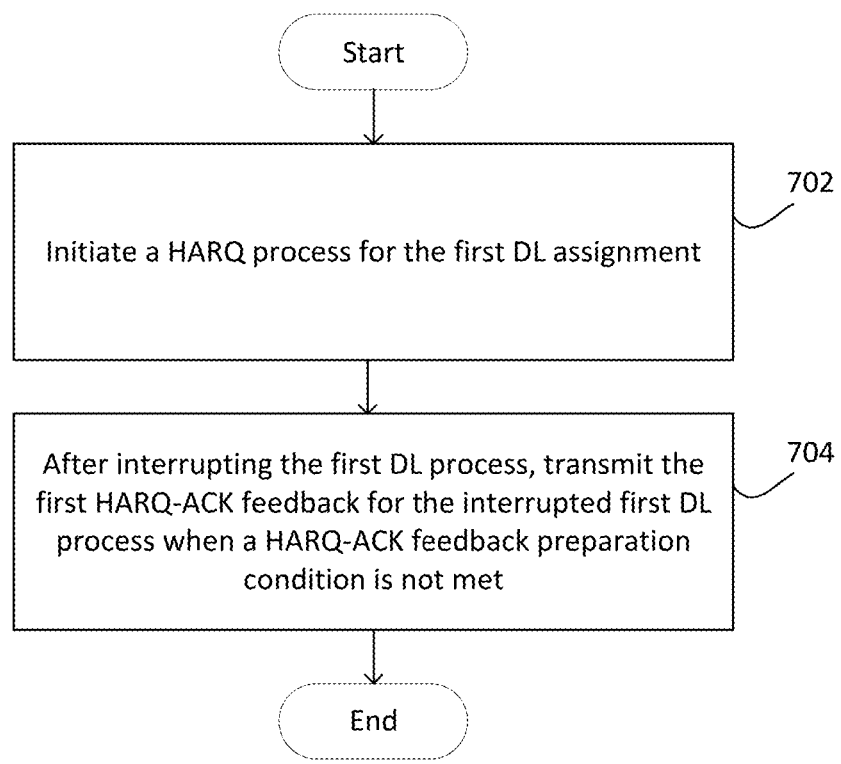
FIG. 7 is a flowchart of a method performed by a UE, in accordance with an example implementation of the present application.

FIG. 7 is a flowchart of a method performed by a UE in accordance with an example implementation of the present application.

In action 702, the UE may initiate a HARQ process for the first DL assignment.

In action 704, after interrupting the first DL process, the UE may transmit the first HARQ-ACK feedback for the interrupted first DL process when a HARQ-ACK feedback preparation condition is not met. In some implementations, the HARQ-ACK feedback preparation condition may include at least one of: (1) the HARQ process is associated with a transmission that is indicated with a Temporary Cell-Radio Network Temporary Identifier (C-RNTI) and a contention resolution process corresponding to a MAC entity is not yet successful, (2) the HARQ process is a broadcast process, and (3) a time alignment timer, which is associated with a Timing Advance Group (TAG) containing a serving cell on which the first HARQ feedback is to be transmitted, stops or expires. For example, if the HARQ process for the first DL assignment is a broadcast process, the UE may still transmit the first HARQ-ACK feedback for the first DL process, even if the first DL process has been interrupted.

In some implementations, methods are provided to handle an OoO HARQ-ACK feedback problem. Taking FIG. 2 as example, the OoO HARQ-ACK feedback problem may happen when the time interval between the reception of $PDCCH_1$ 202 and the transmission of $HARQ-ACK_1$ feedback 212 indicated by $PDCCH_1$ 202 includes another HARQ-ACK feedback transmission (e.g., $HARQ-ACK_2$ feedback 210) that is not indicated/scheduled by $PDCCH_1$ 202. The UE's behavior may depend on the time point when the UE is aware of the OoO HARQ-ACK feedback problem, the time point when the UE receives $PDSCH_2$ 208, the time point when the UE is expected to transmit the corresponding $HARQ-ACK_2$ feedback 212, etc. Taking FIG. 5 as an example, if the UE receives $PDCCH_2$ 508 within Interval-A 51 (e.g., before the reception of $PDSCH_1$ 504 in the time domain) and is aware of the OoO HARQ-ACK feedback problem, the UE may interrupt the first DL process (e.g., by aborting the reception of $PDSCH_1$ 504).

For the convenience of discussion and illustration, a $HARQ-ACK_1$ feedback may be, but not limited to, $HARQ-ACK_1$ feedback 212 illustrated in FIG. 2 or $HARQ-ACK_1$ feedback 506 illustrated in FIG. 5; a $HARQ-ACK_2$ feedback may be, but not limited to, $HARQ-ACK_2$ feedback 210 illustrated in FIG. 2 or $HARQ-ACK_2$ feedback 512 illustrated in FIG. 5; a $PDCCH_1$ may be, but not limited to, $PDCCH_1$ 202 illustrated in FIG. 2 or $PDCCH_1$ 502 illustrated in FIG. 5; a $PDCCH_2$ may be, but not limited to, $PDCCH_2$ 206 illustrated in FIG. 2 or $PDCCH_2$ 508 illustrated in FIG. 5; a $PDSCH_1$ may be, but not limited to, $PDSCH_1$ 204 illustrated in FIG. 2 or $PDSCH_1$ 504 illustrated in FIG. 5; a $PDSCH_2$ may be, but not limited to, $PDSCH_2$ 208 illustrated in FIG. 2 or $PDSCH_2$ 510 illustrated in FIG. 5.

In some implementations, in order that the gNB not be confused about whether the UE had been aware of the first DL scheduling or not, it may be beneficial to force the UE to perform the transmission of HARQ-ACK$_1$ feedback.

Figure 8:
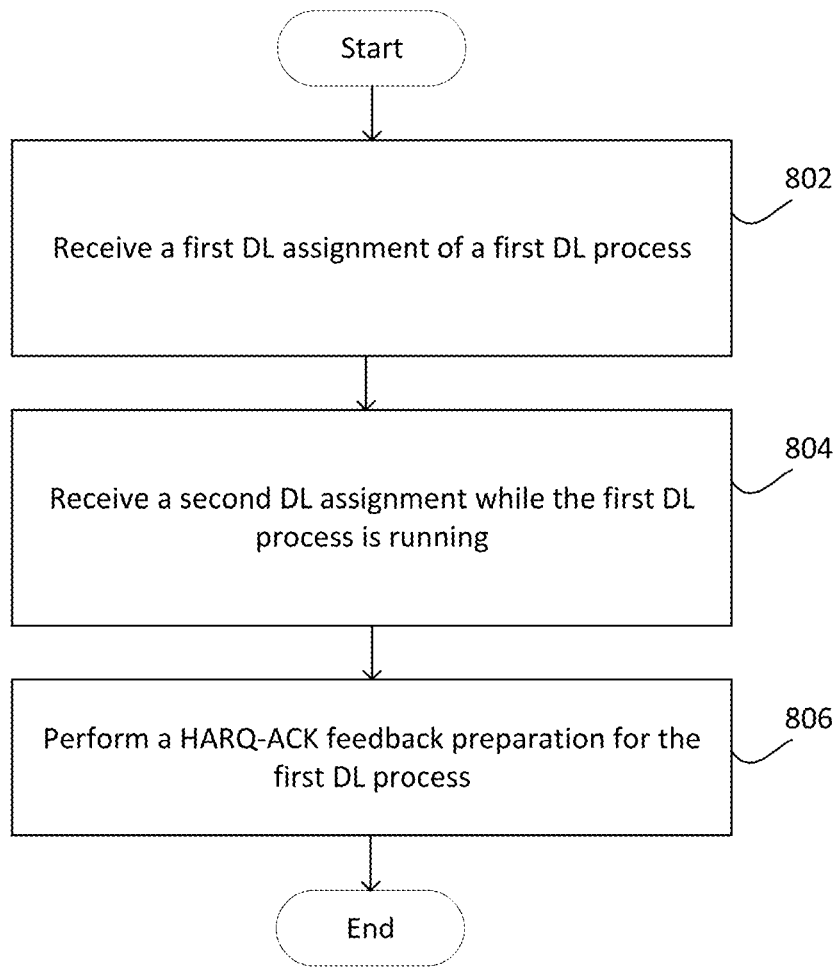
FIG. 8 is a flowchart of a procedure for handling an Out of Order (OoO) HARQ-ACK problem by a UE, in accordance with an example implementation of the present application.

FIG. 8 is a flowchart of a procedure for handling an OoO HARQ-ACK problem by a UE in accordance with an example implementation of the present application.

In action 802, the UE may receive a first DL assignment of a first DL process. For example, the first DL process may include the reception of a PDCCH$_1$, the reception of a PDSCH$_1$ and the transmission of HARQ-ACK$_1$ feedback. The DL process illustrated in FIG. 4 may be used as the first DL process but is not limited thereto.

In action 804, the UE may receive a second DL assignment while the first DL process is running (or not finished). In some implementations, the second DL assignment may indicate a HARQ-ACK transmission that may cause an OoO HARQ-ACK feedback problem.

In action 806, the UE may perform a HARQ-ACK feedback preparation procedure for the first DL process. For example, the UE may generate a HARQ-ACK$_1$ feedback which is indicated by the PDCCH$_1$ by performing the HARQ-ACK feedback preparation procedure, no matter whether the first DL process is interrupted or not. In some implementations, the HARQ-ACK feedback preparation procedure may include a set of behaviors performed by the PHY and MAC entities of the UE. In the following, cases are described based on how a PHY layer/entity of a UE triggers the HARQ-ACK feedback preparation procedure.

Case 1. The PHY layer of the UE implicitly indicates an OoO HARQ-ACK problem to the MAC entity of the UE by delivering the second DL assignment to the MAC entity.

In Case 1, the UE may process the second DL assignment based on the DL process model illustrated in FIG. 4. For example, if the MAC entity is indicated with (or provided with) the second DL assignment by the PHY layer before the MAC entity finishes the first DL process (or before the MAC entity instructs the PHY layer to generate the HARQ-ACK feedback), the MAC entity may interrupt/stop the first DL process immediately, no matter which step of the first DL process the UE is currently performed. Or, the MAC entity of the UE may perform specific procedure(s) for the first DL process, as described in the following sub-cases:

Sub-case 1.1 The MAC entity may perform a specific procedure for the first DL process.

In some implementations, if the PHY layer of the UE receives the PDCCH$_2$ in Interval-A (e.g., Interval-A 51 in FIG. 5), the UE may deprioritize/interrupt the first DL process. In such implementations, the PHY layer may indicate the second DL assignment to the MAC entity. It should be noted that the de-prioritization/interruption may be performed based on certain consideration criteria. In some implementations, the consideration criteria may be, but not limited to, whether the PDSCH$_1$ overlaps the PDSCH$_2$ in the time and/or frequency domain. In some implementations, the consideration criteria may be, but not limited to, whether the PDSCH$_2$ has a higher priority than that of the PDSCH$_1$. In some implementations, the priority of the PDSCH$_1$/PDSCH$_2$ may be determined by the Bandwidth Part (BWP) where the PDSCH$_1$/PDSCH$_2$ is received, determined by the K0 or K1 value corresponding to the PDSCH$_1$/PDSCH$_2$, or determined by the grant size of the PDSCH$_1$/PDSCH$_2$.

In some implementations, if the MAC entity receives the second DL assignment from the PHY layer before finishing the first DL process, the MAC entity may deprioritize/interrupt the first DL process. However, the de-prioritization/interruption of the first DL process may cause the MAC entity to not instruct the PHY layer (e.g., using a HARQ-ACK feedback instruction) to process the HARQ-ACK feedback. Since the HARQ-ACK feedback instruction may be triggered by the MAC entity when or after the TB (e.g., received on the PDSCH$_1$) of the first DL process is generated, the PHY layer may not be instructed by the MAC entity to generate HARQ-ACK feedback for the first DL process. Specifically, depending on whether the second DL assignment is provided by the PHY layer to the MAC entity before the PDSCH$_1$ reception is started or completed, the PHY layer of the UE may not be instructed to generate a HARQ-ACK feedback for the first DL process.

In some implementations, the PHY layer of the UE may be able to trigger HARQ-ACK feedback for the first DL process by itself (e.g., the PHY layer is allowed to generate a HARQ-ACK feedback without receiving an upper layer's instruction).

Figure 9:
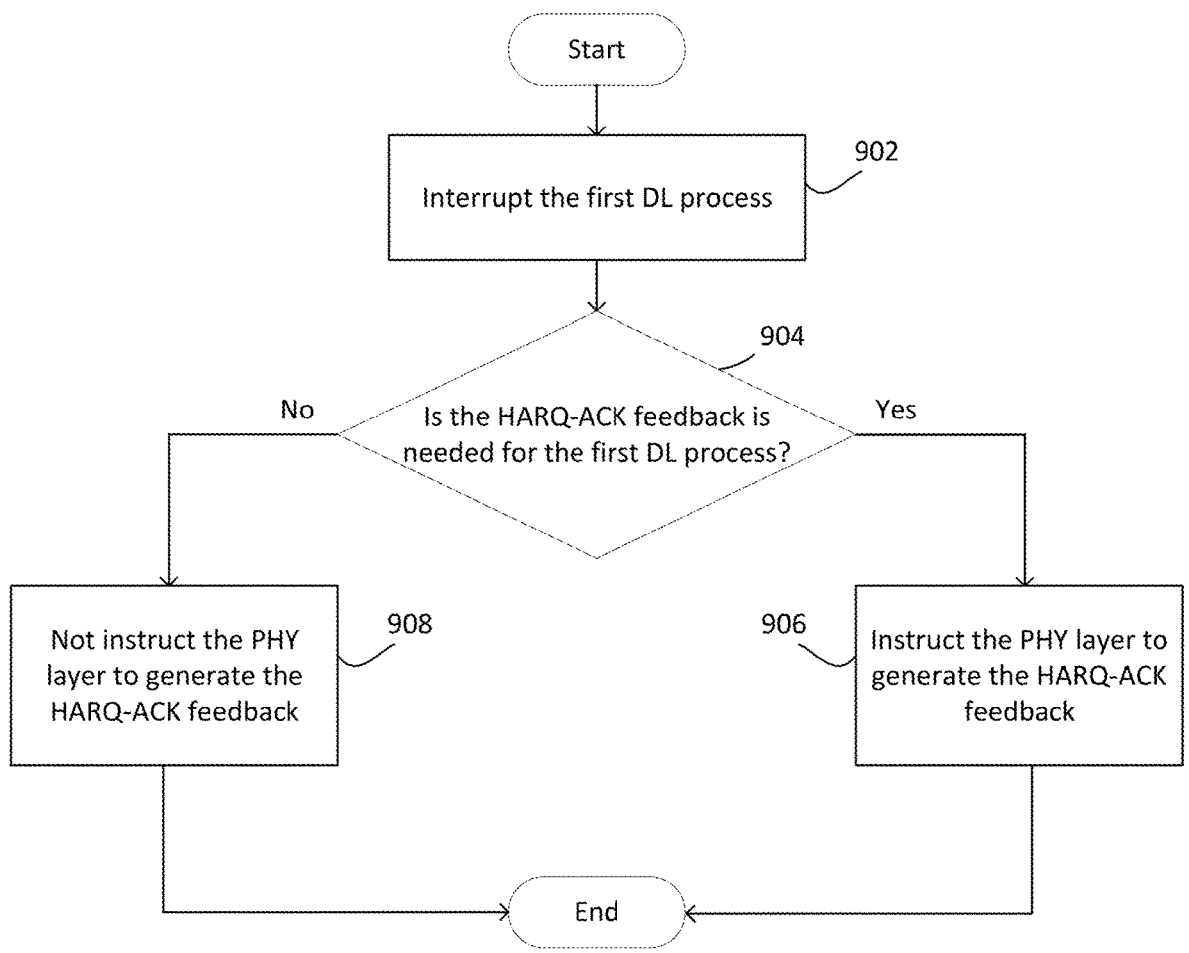
FIG. 9 is a flowchart of a procedure by a UE for determining whether to generate/transmit HARQ-ACK feedback for a DL process, in accordance with an example implementation of the present application.

FIG. 9 is a flowchart of a procedure by a UE for determining whether to generate/transmit HARQ-ACK feedback for a DL process, in accordance with an example implementation of the present application.

As shown in FIG. 9, in action 902, the UE may first interrupt the first DL process.

Then, in action 904, the UE may determine whether the HARQ-ACK feedback should be generated/transmitted for the first DL process.

If the outcome of action 904 is Yes, then in action 906, the MAC entity of the UE may instruct the PHY layer to generate/transmit the HARQ-ACK feedback. Conversely, if the outcome of action 904 is No, then in action 908, the MAC entity of the UE may not instruct the PHY layer to generate/transmit the HARQ-ACK feedback.

In some implementations, the MAC entity may instruct the PHY layer to flush the soft buffer when or after action 906 or 908. In some implementations, the MAC entity may instruct the PHY layer to flush the soft buffer when/after the interruption/de-prioritized/cancellation for the first DL process. In some implementations, the PHY layer may flush the soft buffer without receiving an instruction from the MAC entity. It should be noted that two or more implementations described above may be combined and/or modified without departing from the scope of the present disclosure.

In some implementations, action 904 may be triggered by the MAC entity or the PHY layer. In some implementations, the HARQ-ACK feedback of the first DL process may be omitted (e.g., action 908 is performed) if at least one of the following conditions is satisfied:

a. The first DL assignment is a specific DL assignment;

b. The HARQ process indicated by the first DL assignment is associated with a transmission indicated with a specific RNTI (e.g., Modulation Coding Scheme Cell Radio Network Temporary Identifier (MCS-C-RNTI), Configured Scheduling Radio Network Temporary Identifier (CS-RNTI), C-RNTI);

c. The HARQ process indicated by the first DL assignment is associated with a transmission indicated with a Temporary C-RNTI;

d. The HARQ process indicated by the first DL assignment is associated with a transmission indicated with a Temporary C-RNTI and the contention resolution has not been successful yet;

e. The HARQ process indicated by the first DL assignment is a specific HARQ process;

f. The HARQ process indicated by the first DL assignment is equal to the broadcast process;

g. The time alignment timer (e.g., timeAlignmentTimer), associated with the Timing Advance Group (TAG) containing the Serving Cell on which the HARQ-ACK feedback for the first DL process or the second DL process is to be transmitted/stopped/expired;

h. The first DL process is deprioritized/interrupt due to MAC's consideration;

i. The beam failure recovery procedure had been triggered and not finished for the serving cell on which the HARQ-ACK feedback for the first DL process is to be transmitted;

j. The HARQ process indicated by the first DL assignment is associated with a transmission indicated with a Temporary C-RNTI or C-RNTI and the beam failure recovery procedure has not been successful/finished yet;

k. The random access triggered by the beam failure recovery procedure is not finished for the serving cell on which the HARQ-ACK feedback for the first DL process is to be transmitted;

l. The random access triggered by the beam failure recovery procedure is not finished for the serving cell on which the HARQ-ACK feedback for the first DL process is to be transmitted, wherein the random access for the beam failure recovery procedure is on the Special Cell (SpCell);

m. The random access triggered by the beam failure recovery procedure is not finished for the serving cell on which the HARQ-ACK feedback for the first DL process is to be transmitted, wherein the random access for the beam failure recovery procedure is on the SpCell and the beam failure recovery procedure is triggered by a Secondary Cell (SCell);

n. The HARQ process ID of the second DL process is same as the first DL process;

o. Whether the HARQ process ID of the first or the second DL process is shared with a configured DL assignment, where the HARQ process ID applied for the configured DL assignment may be determined by the UE. The UE may select a HARQ process ID among a HARQ process ID pool which may be preconfigured by the gNB via a downlink RRC message. The HARQ process ID selection may need further consider the time location of the PDSCH resource that is indicated by the configured DL assignment.

p. According to condition n, the HARQ process ID of the second DL process may be within a same HARQ process ID pool as the first DL process;

In some implementations, whether to perform actions 904, 906 and 908 in FIG. 9 or whether to perform the whole procedure of FIG. 9 may depend on one or more consideration factors shown below:

a. Whether the TB of the $PDSCH_1$ had been received by the MAC;

b. Whether the $PDSCH_1$ and $PDSCH_2$ are overlapped with each other in the time domain;

c. Whether the $PDSCH_1$ and $PDSCH_2$ are overlapped with each other in the time domain but not in the frequency domain;

d. Whether the $PDSCH_1$ and $PDSCH_2$ are overlapped with each other in the frequency domain;

e. Whether the $PDSCH_1$ and $PDSCH_2$ are overlapped with each other in the time and frequency domain;

f. The number of resource blocks (RBs) of the $PDSCH_1$;

g. The number of RBs of the $PDSCH_2$;

h. The process type (e.g., as defined by the TS 38.214) indicated by the gNB for $PDSCH_1$;

i. The process type indicated by the gNB for $PDSCH_2$;

j. The processing capability of the UE;

Sub-case 1.2. The MAC entity may determine whether to deprioritize/interrupt/cancel the first DL process depending on whether the $HARQ-ACK_1$ feedback for the first DL process is mandatory or not. The MAC may then instruct the PHY entity whether to deprioritize/interrupt/cancel the first DL process, or simply indicate to the PHY entity with an evaluation result of whether the $HARQ-ACK_1$ feedback for the first DL process is needed or not.

In some implementations, after receiving the second DL assignment from the PHY layer, the MAC entity may determine whether the first DL process should be deprioritized/interrupted/cancelled based on the result of the procedure introduced in FIG. 9. In some implementations, action 902 may be omitted. In such a case, the MAC entity may start from action 904 directly. The MAC entity may determine whether to deprioritize/interrupt/cancel the first DL process based on the result of action 904 in FIG. 9.

In some implementations, the evaluation result of whether the first DL process should be deprioritized/interrupt/cancelled or not may be delivered from the MAC entity to the PHY layer of the UE. That is, the determination result of whether the MAC entity should instruct the PHY layer to generate an acknowledgement for the HARQ process of the first DL process is needed to be performed/triggered.

Sub-case 1.3 The MAC entity or PHY layer of the UE may determine whether to deprioritize/interrupt/cancel the first DL process based on some other consideration factors.

In this sub-case, after receiving the second DL assignment from the PHY layer, the MAC entity may determine whether to deprioritize/interrupt/cancel the first DL process based on at least one of the following consideration factors:

a. Whether the TB of $PDSCH_1$ had been received by the MAC or not;

b. Whether the $PDSCH_1$ and $PDSCH_2$ are overlapped with each other in the time domain;

c. Whether the $PDSCH_1$ and $PDSCH_2$ are overlapped with each other in the time domain but not in the frequency domain;

d. Whether the $PDSCH_1$ and $PDSCH_2$ are overlapped with each other in the frequency domain;

e. Whether the $PDSCH_1$ and $PDSCH_2$ are overlapped with each other in the time and frequency domain;

f. The number of RBs of the $PDSCH_1$;

g. The number of RBs of the $PDSCH_2$;

h. The process type (e.g., as defined by the TS 38.214) indicated by the gNB for $PDSCH_1$;

i. The process type indicated by the gNB for $PDSCH_2$;

j. The processing capability of the UE;

Case 2. The PHY layer explicitly indicates the OoO HARQ-ACK problem to the MAC entity.

In Case 2, an OoO problem indication may be explicitly delivered from the PHY layer to the MAC entity. For example, the implementations of Case 2 may be obtained from Case 1 by replacing the second DL assignment (which is provided by the PHY layer to the MAC entity) introduced in Case 1 with an OoO problem indication. In some other implementations, the implementations of Case 2 may be obtained from Case 1 by additionally introducing the OoO problem indication without modifying the second DL assignment from the PHY layer.

Case 3. The PHY layer explicitly instructs the MAC entity to proceed a HARQ-ACK feedback preparation procedure.

In Case 3, the procedures of FIG. 9 may be triggered by the PHY layer of the UE directly. Or, action 904 may be triggered by the PHY layer directly. It is noted that if the first HARQ process indicated by the first DL assignment is a broadcast HARQ process, the PHY may not instruct the MAC entity to perform the procedure of the FIG. 9 or action 904 of FIG. 9. In some implementations, the broadcast HARQ process may be a specific HARQ process for processing the DL assignment for a Broadcast Control Channel (BCCH).

In some implementations, the PHY layer in Case 3 may consider whether to proceed one or more additional procedures as described below:

Procedure 1: Evaluate whether the first DL process should be deprioritized/interrupted.

Procedure 2: Perform a suspension procedure for the first DL process by keeping/maintaining the data in soft buffer.

Procedure 3: Perform a suspension procedure for the first DL process by conducting a specific HARQ-ACK codebook preparation procedure.

Examples of Text proposals (TPs) of the procedures described above are shown in Tables 2 and 3.

In some implementations, a HARQ process may be considered as being "ongoing" if the HARQ process has not finished the evaluation of whether to instruct the PHY layer to generate the HARQ-ACK feedback, and/or the PHY layer has not generated the HARQ-ACK feedback according to the MAC's instruction.

In some implementations, whether to generate the $HARQ\text{-}ACK_1$ feedback for the first DL process may depend on at least one of the following factors:

The gNB implicitly or explicitly instructs the UE to, or not to, transmit the HARQ-ACK);

The DCI of the first DL assignment is decoded on a UE-specific Search Space (USS) or a Common Search Space (CS S);

TABLE 2

5.3.2.1 HARQ Entity
    The MAC entity shall:
1>if a downlink assignment has been indicated:
  2>allocate the TB(s) received from the physical layer and the associated HARQ
    information to the HARQ process indicated by the associated HARQ information.
1>if a downlink assignment has been indicated for the broadcast HARQ process:
  2>allocate the received TB to the broadcast HARQ process.
1>if a downlink assignment which assigned HARQ feedback timing is earlier than any
  HARQ feedback time for any ongoing HARQ process; or
1> if an OoO problem indication has been received from lower layer for any ongoing
  HARQ process; or
1> if an deprioritization/interrupt/suspend/cancel/skip indication has been received from
  lower layer for any ongoing HARQ process:
  2>if the HARQ process is associated with a transmission indicated with a Temporary
    C-RNTI and the Contention Resolution is not yet successful; or
  2>if the HARQ process is equal to the broadcast process; or
  2>if the timeAlignmentTimer, associated with the TAG containing the Serving Cell on
    which the HARQ feedback is to be transmitted, is stopped or expired; or
  2>The random access triggered by the beam failure recovery procedure is not finished
    for the Serving Cell on which the HARQ-ACK feedback for the HARQ feedback is
    to be transmitted:
    3>not instruct the physical layer to generate acknowledgement(s) of the data in this
      TB.
  2>else:
    3>instruct the physical layer to generate acknowledgement(s) of the data in this TB.

TABLE 3

5.3.2.1 HARQ Entity
    The MAC entity shall:
1>if a downlink assignment has been indicated:
  2>allocate the TB(s) received from the physical layer and the associated HARQ
    information to the HARQ process indicated by the associated HARQ information.
1>if a downlink assignment has been indicated for the broadcast HARQ process:
  2>allocate the received TB to the broadcast HARQ process.
1>if a downlink assignment which assigned HARQ feedback timing is earlier than any
  HARQ feedback time for any ongoing HARQ process; or
1> if an OoO problem indication has been received from lower layer for any ongoing
  HARQ process:
  2>if the HARQ process is associated with a transmission indicated with a Temporary
    C-RNTI and the Contention Resolution is not yet successful; or
  2>if the HARQ process is equal to the broadcast process; or
  2>if the timeAlignmentTimer, associated with the TAG containing the Serving Cell on
    which the HARQ feedback is to be transmitted, is stopped or expired; or
  2>The random access triggered by the beam failure recovery procedure is not finished
    for the Serving Cell on which the HARQ-ACK feedback for the HARQ feedback is
    to be transmitted:
    3>not instruct the physical layer to generate acknowledgement(s) of the data in this
      TB;
    3>instruct the physical layer to deprioritize/interrupt/suspend/cancel/skip the DL
      assignment corresponding the ongoing HARQ process.
  2>else:
    3>instruct the physical layer to generate acknowledgement(s) of the data in this TB.

The DCI of the second DL assignment is decoded on a USS or a CSS;

The DCI of the second DL assignment is decoded on a USS and the first DCI of the first DL assignment is decoded on a CSS;

The DCI of the second DL assignment is decoded on a CSS and the first DCI of the first DL assignment is decoded on a Common Search Space (CSS) or USS;

The DCI of the first DL assignment is with a CRC scrambled by a specific RNTI (e.g., C-RNTI, MCS-C-RNTI or CS-RNTI);

The DCI of the second DL assignment is with a CRC scrambled by a specific RNTI (e.g., C-RNTI, MCS-C-RNTI or CS-RNTI);

The DCI of the second DL assignment is with a CRC scrambled by a C-RNTI/MCS-C-RNTI/CS-RNTI and the DCI of the first DL assignment with a CRC scrambled by a C-RNTI/MCS-C-RNTI/CS-RNTI;

The PHY layer implicitly or explicitly instruct the MAC entity to, or not to, generate the $HARQ\text{-}ACK_1$ feedback;

Step 2 of the DL process illustrated in FIG. 4 is performed, and the MAC entity is implicitly indicated by the PHY layer that Step 5 (and steps afterward) is not to be performed;

The gNB implicitly or explicitly instructs the UE to, or not to, transmit the $HARQ\text{-}ACK_1$ feedback via the $PDCCH_2$;

The gNB instructs the UE to, or not to, transmit the $HARQ\text{-}ACK_1$ feedback together with the $HARQ\text{-}ACK_2$ feedback;

In some implementations, all the cases described above may be performed when at least one of the following conditions are satisfied:

The first and/or second DL assignment is scrambled by a specific RNTI (e.g., C-RNTI, MCS-C-RNTI or CS-RNTI);

The DCI of first and/or second DL assignment is decoded from the USS/CSS;

The first and/or second DL assignment is for new or retransmission;

The first and/or second DL process is configured with repetitions or not;

The time interval between any two of the $PDCCH_1$, $PDCCH_2$, $PDSCH_1$, $PDSCH_2$, $HARQ\text{-}ACK_1$ feedback and $HARQ\text{-}ACK_2$ feedback is larger or smaller than a predefined value, where the value may depend on the UE's capability, the service type of each DL assignment, etc.;

One or more explicit or implicit indications are included in the first and/or second DL assignment;

Whether the first and/or second DL process applied a same HARQ process ID;

Whether the $PDSCH_1$ and $PDSCH_2$ are overlapped with each other in the time domain;

Whether the $PDSCH_1$ and $PDSCH_2$ are overlapped with each other in both time and frequency domain.

In some implementations, the RS ID described above may be replaced by any other ID(s) which is used for explicitly or implicitly indicating a new beam to the gNB.

In some implementations, a DL RRC message may be an RRC reconfiguration message (e.g., including the RRCReconfiguration Information Element (IE)), an RRC resume message (e.g., including the RRCResume IE), an RRC reestablishment message (e.g., including the RRCReestablishment IE), an RRC setup message (e.g., including the RRCSetup IE), or any other DL unicast RRC message.

In some implementations, a beam may be considered as a spatial domain filter. For example, a wireless device (e.g., a UE) may apply the spatial filter in an analog domain by adjusting the phase and/or amplitude of a signal before transmitting the signal through a corresponding antenna element. In another example, the spatial filter may be applied in a digital domain by Multi-Input Multi-Output (MIMO) techniques in the wireless communication system. For example, a UE may perform a Physical Uplink Shared Channel (PUSCH) transmission by using a specific beam which is a specific spatial/digital domain filter. In some implementations, a beam may be represented by (or corresponding to) an antenna, an antenna port, an antenna element, a group of antennas, a group of antenna ports, or a group of antenna elements. In some implementations, a beam may be formed by (or associated with) a specific RS resource. The beam may be equivalent to a spatial domain filter through which the Electromagnetic (EM) waves are radiated.

In some implementations, the transmitted signaling means that the MAC Control Element (CE)/MAC PDU/layer 1 signaling/higher layer signaling that contains (or corresponds to) the signaling is starting to be transmitted, completely transmitted, or has already delivered to the corresponding HARQ process/buffer for transmission. In some implementations, the transmitted signaling means that the corresponding HARQ-ACK feedback of a specific MAC PDU is received, where the specific MAC PUD may include the MAC CE/layer 1 signaling/higher layer signaling that contains (or corresponds to) the signaling. In some implementations, the transmitted signaling means that the MAC CE/MAC PDU corresponding to the signaling is built or generated.

In some implementations, when a MAC-CE-based Beam Failure Recovery (BFR) procedure is configured for an SCell, it means that the BFR function for the SCell is configured and/or enabled. In some implementations, when the BFR function for the SCell is configured, it means that the base station (e.g., a gNB) has configured one or more MAC-CE-based BFR configurations for the SCell. In some implementations, when the BFR function for the SCell is enabled, it means that the base station (e.g., a gNB) has configured one or more MAC-CE-based BFR configurations for the SCell, with some implicit or explicit mechanisms being provided to activate or deactivate the BFR function of the UE/MAC entity/serving cell.

In some implementations, a PDCCH may be transmitted by the gNB to the UE, and the UE may receive the PDCCH from the gNB. Similarly, a PDSCH may be transmitted by the gNB to the UE, and the UE may receive the PDSCH from the gNB. For UL transmissions, a PUSCH/PUCCH may be transmitted by the UE to the gNB, and the PUSCH/Physical Uplink Control Channel (PUCCH) may be received by the gNB.

In some implementations, a PDSCH/PUSCH transmission may span multiple symbols in the time domain, where the time duration of a PDSCH/PUSCH (transmission) may be a time interval that starts from the beginning of the first symbol of the PDSCH/PUSCH (transmission) and end at the end of the last symbol of the PDSCH/PUSCH (transmission).

In some implementations, the terms "interrupt," "stop," "cancel," and "skip" may be interchangeable.

In some implementations, the operation of instructing the PHY layer to generate acknowledgement may include, or have the same meaning as, the operation of instructing the PHY layer to perform/generate a HARQ-ACK feedback (procedure).

In some implementations, the terms "acknowledgement," "HARQ-ACK," and "HARQ-ACK feedback" may be interchangeable.

In some implementations, a cell (e.g., a Primary Cell (PCell) or an SCell) may be a radio network object that may be uniquely identified by a UE through the corresponding identification information, which may be broadcast by a UTRAN access point in a geographical area. A cell may be operated in a Frequency Division Duplex (FDD) or a Time Division Duplex (TDD) mode.

In some implementations, for a UE operating in the RRC_CONNECTED state and not configured with CA/Dual Connectivity (DC), the UE may be configured with only one serving cell (e.g., the primary cell). For a UE operating in the RRC_CONNECTED state and configured with CA/DC, the UE may be configured with multiple serving cells including an SpCell and one or more SCells.

In addition, in case of Carrier Aggregation (CA), two or more Component Carriers (CCs) may be aggregated. A UE may simultaneously receive or transmit signals on one or more of the CCs depending on its capabilities. CA may be supported with both the contiguous and non-contiguous CCs. When CA is applied, the frame timing and the System Frame Number (SFN) may be aligned across cells that are aggregated. In some implementations, the maximum number of configured CCs for a UE may be 16 for DL and 16 for UL. When CA is configured, the UE may have only one RRC connection with the network. During the RRC connection establishment/re-establishment/handover, one serving cell may provide the Non-Access Stratum (NAS) mobility information, and at RRC connection re-establishment/handover, one serving cell may provide the security input, where the serving cell may be referred to as the PCell. Depending on UE capabilities, SCells may be configured to form together with the PCell as a set of serving cells for the UE. The configured set of serving cells for a UE therefore always consists of one PCell and one or more SCells.

In some implementations, for Configured Grant (CG) Type 1, the RRC entity may directly provide the configured uplink grant (including the periodicity). For CG Type 2, the RRC entity may define the periodicity of the PUSCH resources of the CG, while the PDCCH addressed to the CS-RNTI may either signal and activate the configured uplink grant or deactivate it. That is, the PDCCH addressed to the CS-RNTI may indicate that the configured uplink grant can be reused according to the periodicity defined by the RRC entity, until the configured unlink grant is deactivated. When a configured uplink grant is active, a UL transmission according to the configured uplink grant may be performed if the UE cannot find its C-RNTI/CS-RNTI on the PDCCH(s). If the UE receives its C-RNTI/CS-RNTI on the PDCCH(s), the PDCCH allocation may override the configured uplink grant.

In some implementations, a HARQ process may be used to ensure the transmissions between two or more peer entities at Layer 1 (e.g., PHY layer). A single HARQ process may support a TB when the PHY layer is not configured for DL/UL spatial multiplexing. When the PHY layer is configured for the DL/UL spatial multiplexing, a single HARQ process may support one or multiple TBs. Each serving cell may correspond to a HARQ entity, where each HARQ entity may support a parallel processing of the DL and UL HARQ processes.

In some implementations, a HARQ-ACK may include a 1-bit indicator, where the HARQ-ACK may be a Negative Acknowledgement (NACK) when the bit value of the indicator is "0" and may be a positive Acknowledgement (ACK) when the bit value of the indicator is "1".

In some implementations, the MAC entity of the UE may setup one or more timers for individual purposes, such as triggering uplink signaling retransmissions or limiting uplink signaling retransmission periods. When a timer (e.g., the timers described in various implementations of the present application) maintained by the MAC entity starts, the timer may start running until it stops or expires. In addition, the timer may not run when it does not start. A timer may start when it is not running. Also, a timer may restart when it is running. In some implementations, a timer may always start or restart from an initial value, where the initial value can be, but is not limited to, configured by the gNB via downlink RRC signaling.

In some implementations, a BWP may be a subset of the total cell bandwidth of a cell. By configuring one or more BWPs to the UE and informing the UE that which of the configured BWPs is the currently the active BWP, Bandwidth Adaptation (BA) may be achieved. To enable the BA mechanism on the PCell, the gNB may configure the UE with one or more UL and DL BWPs. In case of CA, to enable the BA mechanism on SCells, the gNB may configure the UE with one or more DL BWPs at least (which means that there may be no UL BWPs configure to the UE). For the PCell, the initial BWP may be the BWP used for initial access. For the SCell(s), the initial BWP may be the BWP configured for the UE to first operate during the SCell activation process. In some implementations, the UE may be configured with a First-Active UL BWP by a firstActiveUplinkBWP IE field. If the First-Active UL BWP is configured for an SpCell, the firstActiveUplinkBWP IE field may contain the ID of the UL BWP to be activated when the RRC (re)configuration is performed. If the field is absent, the RRC (re)configuration may not trigger a BWP switch. If the First-Active uplink BWP is configured for an SCell, the firstActiveUplinkBWP IE field may contain the ID of the UL BWP to be used upon the MAC-activation of an SCell.

In some implementations, the gNB may dynamically allocate resources to the UE via a C-RNTI on one or more PDCCHs. The UE may always monitor the PDCCH(s) in order to find possible assignments when its DL reception is enabled (e.g., activity governed by DRX when configured). In some implementations, when CA is configured, the same C-RNTI may be applied to all serving cells. In some implementations, the PDCCH may be used to schedule the DL transmissions on a PDSCH and the UL transmissions on a PUSCH.

In some implementations, the RRC entity may configure the initial value of a time alignment timer. The time alignment timer may be used for the maintenance of UL time alignment, where the time alignment timer may be configured per timing advance group maintained. The time alignment timer may be used to control the time length that the MAC entity considers the serving cells belonging to the associated TAG to be uplink time aligned.

Figure 10:
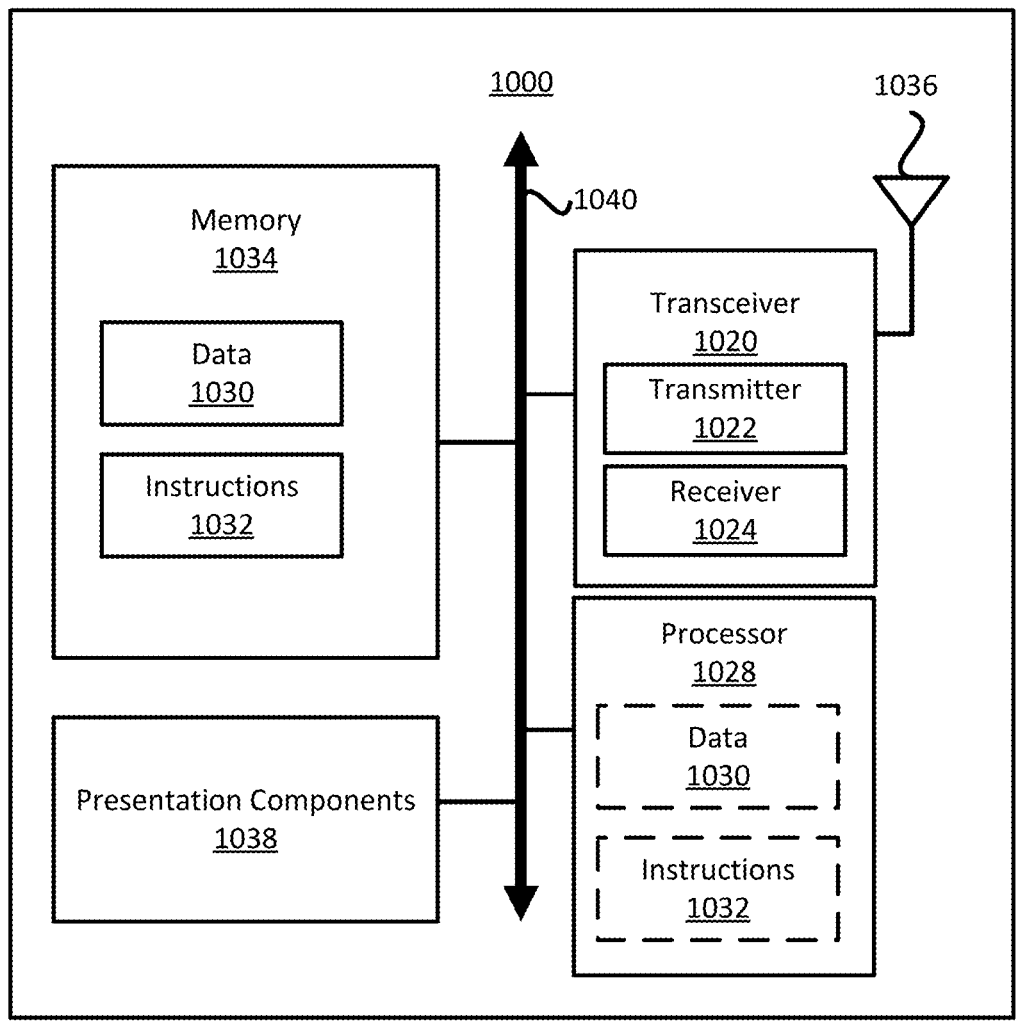
FIG. 10 is a block diagram illustrating a node for wireless communication, in accordance with various aspects of the present disclosure.

FIG. 10 is a block diagram illustrating a node for wireless communication, in accordance with various aspects of the present disclosure. As shown in FIG. 10, a node 1000 may include a transceiver 1020, a processor 1028, a memory 1034, one or more presentation components 1038, and at least one antenna 1036. The node 1000 may also include an RF spectrum band module, a BS communications module, a network communications module, and a system communications management module, Input/Output (I/O) ports, I/O components, and power supply (not explicitly shown in FIG. 10). Each of these components may be in communication with each other, directly or indirectly, over one or more buses 1040. In one implementation, the node 1000 may be a UE, a BS, or any other apparatus of wireless communications that performs various functions described herein, for example, with reference to FIGS. 1 through 9.

The transceiver 1020 having a transmitter 1022 (e.g., transmitting/transmission circuitry) and a receiver 1024 (e.g., receiving/reception circuitry) may be configured to transmit and/or receive time and/or frequency resource partitioning information. In some implementations, the transceiver 1020 may be configured to transmit in different types of subframes and slots including, but are not limited to, usable, non-usable and flexibly usable subframes and slot formats. The transceiver 1020 may be configured to receive data and control channels.

The node 1000 may include a variety of computer-readable media. Computer-readable media may be any available media that may be accessed by the node 1000 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 1034 may include computer-storage media in the form of volatile and/or non-volatile memory. The memory 1034 may be removable, non-removable, or a combination thereof. Examples of memory includes solid-state memory, hard drives, optical-disc drives, etc. As illustrated in FIG. 10, the memory 1034 may store computer-readable, computer-executable instructions 1032 (e.g., software codes) that are configured to, when executed, cause the processor 1028 to perform various functions described herein, for example, with reference to FIGS. 1 through 9. Alternatively, the instructions 1032 may not be directly executable by the processor 1028 but be configured to cause the node 1000 (e.g., when compiled and executed) to perform various functions described herein.

The processor 1028 (e.g., having processing circuitry) may include a Central Processing Unit (CPU), a microcontroller, an ASIC, an intelligent hardware device, or any combination thereof configured to perform the functions described herein. The processor 1028 may include memory. The processor 1028 may process the data 1030 and the instructions 1032 received from the memory 1034, and information through the transceiver 1020, the base band communications module, and/or the network communications module. The processor 1028 may also process information to be sent to the transceiver 1020 for transmission through the antenna 1036, to the network communications module for transmission to a core network.

One or more presentation components 1038 may present data indications to a person or other devices. Examples of presentation components 1038 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) comprising:
   at least one processor; and
   at least one non-transitory computer-readable medium coupled to the at least one processor, and storing one or more computer-executable instructions that, when executed by the at least one processor, cause the UE to:
   receive a first Downlink (DL) assignment on a first Physical Downlink Control Channel (PDCCH), wherein the first DL assignment determines a first time location of a first time slot including a first resource for transmitting a first Hybrid Automatic Repeat reQuest (HARQ)-Acknowledgement (ACK) feedback;
   initiate a HARQ process for the first DL assignment;
   perform a first DL process in response to receiving the first DL assignment, wherein the first DL process includes at least one operation for the UE to generate the first HARQ-ACK feedback;
   receive a second DL assignment on a second PDCCH in a time interval between an end of the first PDCCH and a beginning of the first resource;
   interrupt the first DL process in response to receiving the second DL assignment; and
   after determining that a HARQ-ACK feedback preparation condition is not met, transmit the first HARQ-ACK feedback for the first DL process that has been interrupted,
   wherein the HARQ-ACK feedback preparation condition includes at least one of:
   a beam failure recovery procedure having been triggered by a Secondary Cell (SCell) but not finished for a serving cell on which the first HARQ-ACK feedback is transmitted, or
   a random access procedure, which is triggered on a Special Cell (SpCell) due to the beam failure recovery procedure, not having been finished for the serving cell on which the first HARQ- ACK feedback is transmitted.

2. The UE of claim 1, wherein the one or more computer-executable instructions, when executed by the at least one processor, further cause the UE to:

instruct, by using a Medium Access Control (MAC) entity of the UE, a HARQ entity of the UE to cancel processing for the first DL assignment and interrupt the first DL process.

3. The UE of claim 1, wherein the HARQ-ACK feedback preparation condition further includes a time alignment timer associated with a Timing Advance Group (TAG) containing the serving cell on which the first HARQ feedback is transmitted, being stopped or expired.

4. The UE of claim 1, wherein the one or more computer-executable instructions, when executed by the at least one processor, further cause the UE to:
determine a second time location of a second time slot including a second resource for transmitting a second HARQ-ACK feedback based on the second DL assignment, wherein the second time location of the second resource is earlier than the first time location of the first resource in time domain.

5. A method performed by a User Equipment (UE), the method comprising:
receiving a first Downlink (DL) assignment on a first Physical Downlink Control Channel (PDCCH), wherein the first DL assignment determines a first time location of a first time slot including a first resource for transmitting a first Hybrid Automatic Repeat reQuest (HARQ)-Acknowledgement (ACK) feedback;
initiating a HARQ process for the first DL assignment;
performing a first DL process in response to receiving the first DL assignment, wherein the first DL process includes at least one operation for the UE to generate the first HARQ-ACK feedback;
receiving a second DL assignment on a second PDCCH in a time interval between an end of the first PDCCH and a beginning of the first resource;
interrupting the first DL process in response to receiving the second DL assignment; and
after determining that a HARQ-ACK feedback preparation condition is not met, transmitting the first HARQ-ACK feedback for the first DL process that has been interrupted,
wherein the HARQ-ACK feedback preparation condition includes at least one of:
a beam failure recovery procedure having been triggered by a Secondary Cell (SCell) but not finished for a serving cell on which the first HARQ-ACK feedback is transmitted, or
a random access procedure, which is triggered on a Special Cell (SpCell) due to the beam failure recovery procedure, not having been finished for the serving cell on which the first HARQ- ACK feedback is transmitted.

6. The method of claim 5, further comprising:
instructing, by using a Medium Access Control (MAC) entity of the UE, a HARQ entity of the UE to cancel processing for the first DL assignment and interrupt the first DL process.

7. The method of claim 5, wherein the HARQ-ACK feedback preparation condition further includes
a time alignment timer associated with a Timing Advance Group (TAG) containing the serving cell on which the first HARQ feedback is transmitted, being stopped or expired.

8. The method of claim 5, further comprising:
determining a second time location of a second time slot including a second resource for transmitting a second HARQ-ACK feedback based on the second DL assignment, wherein the second time location of the second resource is earlier than the first time location of the first resource in time domain.

* * * * *